United States Patent
Jang et al.

(10) Patent No.: US 10,611,331 B2
(45) Date of Patent: Apr. 7, 2020

(54) AIRBAG APPARATUS

(71) Applicant: HYUNDAI MOBIS CO., LTD., Seoul (KR)

(72) Inventors: Rae Ick Jang, Seongnam-si (KR); Jong Seob Lee, Suwon-si (KR); Ga Ram Jeong, Yongin-si (KR); Yoo Hoon Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 69 days.

(21) Appl. No.: 16/118,438

(22) Filed: Aug. 31, 2018

(65) Prior Publication Data
US 2019/0061671 A1   Feb. 28, 2019

(30) Foreign Application Priority Data

Aug. 31, 2017 (KR) .......... 10-2017-0110810
Aug. 31, 2017 (KR) .......... 10-2017-0110811
Aug. 31, 2017 (KR) .......... 10-2017-0110812
Aug. 31, 2017 (KR) .......... 10-2017-0110813

(51) Int. Cl.
*B60R 21/16* (2006.01)
*B60R 21/233* (2006.01)
(Continued)

(52) U.S. Cl.
CPC .......... *B60R 21/233* (2013.01); *B60R 21/00* (2013.01); *B60R 21/239* (2013.01); *B60R 21/2338* (2013.01); *B60R 21/26* (2013.01); *B60R 21/261* (2013.01); *B60R 2021/0004* (2013.01); *B60R 2021/0009* (2013.01); *B60R 2021/0048* (2013.01); *B60R 2021/2395* (2013.01); *B60R 2021/23308* (2013.01);
(Continued)

(58) Field of Classification Search
CPC ... B60R 21/233; B60R 21/2338; B60R 21/26; B60R 21/261; B60R 21/239; B60R 21/00; B60R 2021/2395; B60R 2021/0004; B60R 2021/23386; B60R 2021/0048; B60R 2021/23324; B60R 2021/23382; B60R 2021/26094; B60R 2021/2612; B60R 2021/0009; B60R 2021/23308
USPC ........................................... 280/743.1, 743.2
See application file for complete search history.

(56) References Cited

U.S. PATENT DOCUMENTS 9,533,652 B1 * 1/2017 Paxton .................. B60R 21/239
2011/0018240 A1 * 1/2011 Marable ................ B60R 21/231
280/728.3
(Continued)

*Primary Examiner* — Toan C To
(74) *Attorney, Agent, or Firm* — H.C. Park & Associates, PLC

(57) ABSTRACT

An airbag apparatus may include: a first chamber connected to an inflator, and supporting the head of a passenger in case of a head-on collision of a vehicle; a second chamber connected to one side of the first chamber, and suppressing the head of the passenger from moving in a diagonal direction in case of an oblique collision of the vehicle; a communication tube formed on the first chamber to introduce gas of the first chamber into the second chamber, and having a tightening channel formed along the circumference thereof; and a valve tether including: a tether ring installed through the inside of the tightening channel; and a tether puller connected to the tether ring to pull the tether ring in one direction, and closing the communication tube by pulling the tether ring when the first chamber is completely deployed.

20 Claims, 43 Drawing Sheets

(51) Int. Cl.
  *B60R 21/00*   (2006.01)
  *B60R 21/2338*  (2011.01)
  *B60R 21/26*   (2011.01)
  *B60R 21/261*  (2011.01)
  *B60R 21/239*  (2006.01)

(52) U.S. Cl.
  CPC ............... *B60R 2021/23324* (2013.01); *B60R 2021/23382* (2013.01); *B60R 2021/23386* (2013.01); *B60R 2021/2612* (2013.01); *B60R 2021/26094* (2013.01)

(56) References Cited

U.S. PATENT DOCUMENTS

| | | | |
|---|---|---|---|
| 2012/0068444 A1* | 3/2012 | Suzuki | B60R 21/239 280/739 |
| 2012/0112441 A1* | 5/2012 | Ohara | B60R 21/205 280/729 |
| 2013/0221644 A1* | 8/2013 | Beattie | B60R 21/239 280/742 |
| 2014/0300094 A1* | 10/2014 | Williams | B60R 21/239 280/743.2 |
| 2015/0298643 A1* | 10/2015 | Schneider | B60R 21/233 280/729 |
| 2015/0375707 A1* | 12/2015 | Saito | B60R 21/239 280/728.3 |
| 2015/0375711 A1* | 12/2015 | Umehara | B60R 21/239 280/740 |
| 2018/0312131 A1* | 11/2018 | Jeong | B60R 21/2338 |
| 2019/0039557 A1* | 2/2019 | Barnes | B60R 21/205 |

* cited by examiner

AIRBAG APPARATUS

CROSS-REFERENCES TO RELATED APPLICATIONS

This application claims priority from and the benefit of Korean Patent Application Nos. 10-2017-0110810, 10-2017-0110811, 10-2017-0110812, and 10-2017-0110813, all filed on Aug. 31, 2017, which are hereby incorporated by reference for all purposes as if set forth herein.

BACKGROUND

Field

Exemplary embodiments relate to an airbag apparatus, and more particularly, to an airbag apparatus which can suppress the head of a passenger from turning or moving in a diagonal direction in case of an oblique collision of a vehicle.

Discussion of the Background

In general, a vehicle includes airbags to protect a passenger. The airbags are disposed at various positions depending on a passenger's parts which need to be protected. A steering wheel includes a driver airbag to protect the head of a driver, and a passenger airbag is installed at the front of the vehicle so as to protect the head of a passenger seated beside the driver.

In case of a head-on or oblique collision, an electronic control module decides whether to ignite a detonator of an inflator. When gas is generated from the inflator, an airbag cushion is expanded by the generated gas. Recently, the strict regulations for protecting passengers have increased the size of the airbag cushion.

However, when gas leaks from the airbag cushion after the airbag cushion is completely expanded, the support force or expansive force of the airbag cushion may be reduced. The reduction of the support force or expansive force may make it difficult to prevent the head of a passenger from moving in a diagonal direction from the airbag cushion.

However, since the increase in size of the airbag cushion increases the expansion time of the airbag cushion, the time for the airbag cushion to hold the head may be delayed in case of an oblique collision of the vehicle. When the time for the airbag cushion to hold the head is delayed, the head or neck may be injured because the head cannot be suppressed from moving in the diagonal direction.

Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention provide an airbag apparatus which can suppress the head of a passenger from turning or moving in a diagonal direction in case of an oblique collision of a vehicle.

In one exemplary embodiment, an airbag apparatus may include: a first chamber connected to an inflator, and supporting the head of a passenger in case of a head-on collision of a vehicle; a second chamber connected to one side of the first chamber so as to be supported by the first chamber, and suppressing the head of the passenger from moving in a diagonal direction in case of an oblique collision of the vehicle; a communication tube formed on the first chamber to introduce gas of the first chamber into the second chamber, and having a tightening channel formed along the circumference thereof; and a valve tether including: a tether ring installed through the inside of the tightening channel; and a tether puller connected to the tether ring to pull the tether ring in one direction, and connected to the first chamber so as to close the communication tube by pulling the tether ring when the first chamber is completely deployed.

The second chamber may be eccentrically disposed at the inboard side of the first chamber to avoid a collision with the head of the passenger in case of a head-on collision of the vehicle.

The tightening channel may have a through-hole through which the tether puller is drawn to the outside of the tightening channel.

The tether ring may have a tightening ring formed at one side thereof, such that the tether puller is passed through the tightening ring.

The tightening ring may be movably disposed in the tightening channel.

The tightening ring may be fixed to the tightening channel by a first fixing sewed portion.

The tether puller may be connected to either side of the tether ring so as to pass through the through-hole.

One side of the tether ring may be fixed to the tightening channel by a second fixing sewed portion, and the tether puller may be connected to the other side of the tether ring.

The communication tube may be formed in a rectangular shape, and the tightening channel may be formed in a rectangular frame shape.

The airbag apparatus may further include a connection tether connecting the first and second chambers to restrict the second chamber from being pushing to the outside of the first chamber by the load of the head.

In another exemplary embodiment, an airbag apparatus may include: a first chamber connected to an inflator, and supporting the head of a passenger in case of a head-on collision of a vehicle; a second chamber connected to one side of the first chamber so as to be supported by the first chamber, and suppressing the head of the passenger from moving in a diagonal direction in case of an oblique collision of the vehicle; a communication tube formed on the first chamber to introduce gas of the first chamber into the second chamber; a cross connector installed across the communication tube, and having both sides connected to the communication tube; and a pair of valve tethers connected to the communication tube through the cross connector, and connected to the first chamber so as to close the communication tube by pulling the communication tube when the first chamber is deployed.

The cross connector may have a cross hole through which the plurality of valve tethers are passed.

The cross hole may be formed in the longitudinal center of the cross connector.

Both sides of the cross connector may be fixed to the communication tube by cross sewed portions, respectively.

The pair of valve tethers may be installed at both sides of the communication tube, and one ends of the pair of valve tethers may be disposed in the communication tube so as to face each other.

In another exemplary embodiment, an airbag apparatus may include: a first chamber connected to an inflator, and supporting the head of a passenger in case of a head-on collision of a vehicle; a second chamber connected to one side of the first chamber so as to be supported by the first chamber, and suppressing the head of the passenger from moving in a diagonal direction in case of an oblique collision of the vehicle; a communication tube formed on the first chamber to introduce gas of the first chamber into the second chamber; and a pair of valve tethers connected to the communication tube, and connected to the first chamber so as to close the communication tube by pulling the communication tube when the first chamber is deployed.

The pair of valve tethers may be disposed so as to cross each other.

The pair of valve tethers may be formed in a band shape.

The pair of valve tethers may be installed at both sides of the communication tube, and one ends of the pair of valve tethers may be installed in the communication tube so as to face each other.

The second chamber may be eccentrically disposed at the inboard side of the first chamber so as to avoid a collision with the head of the passenger in case of a head-on collision of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
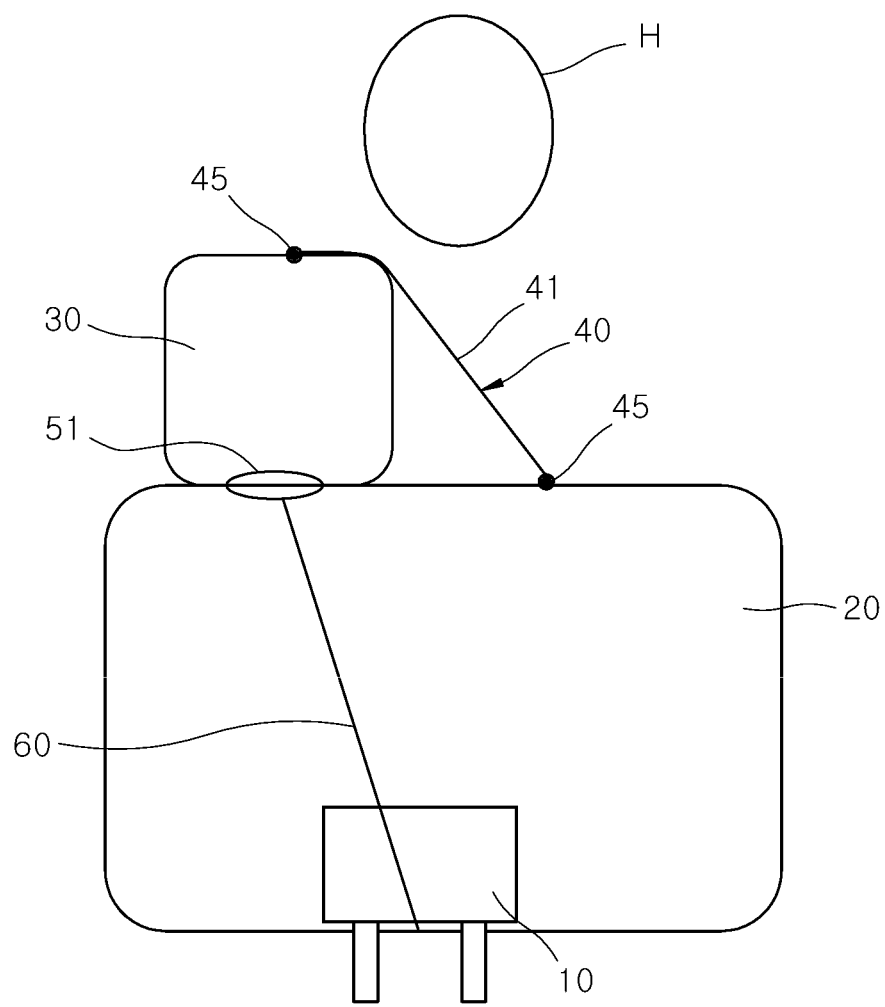
FIG. 1 is a plan view illustrating an airbag apparatus in accordance with a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of exemplary embodiments with reference to the accompanying drawings. However, the present invention is not be limited to the exemplary embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Figure 2:
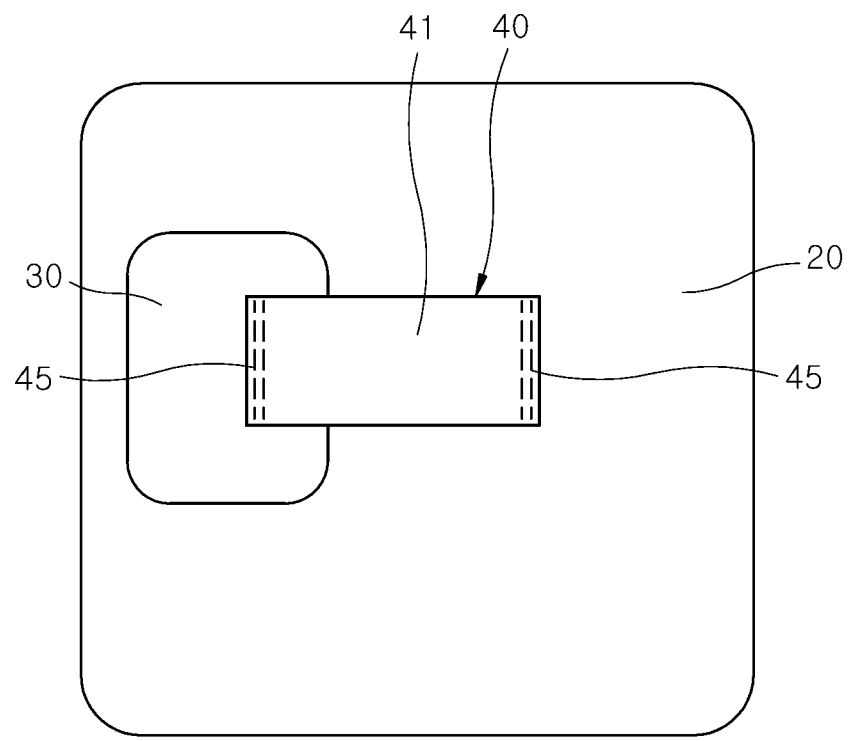
FIG. 2 is a front view illustrating the airbag apparatus in accordance with the first exemplary embodiment of the present invention.
Figure 3:
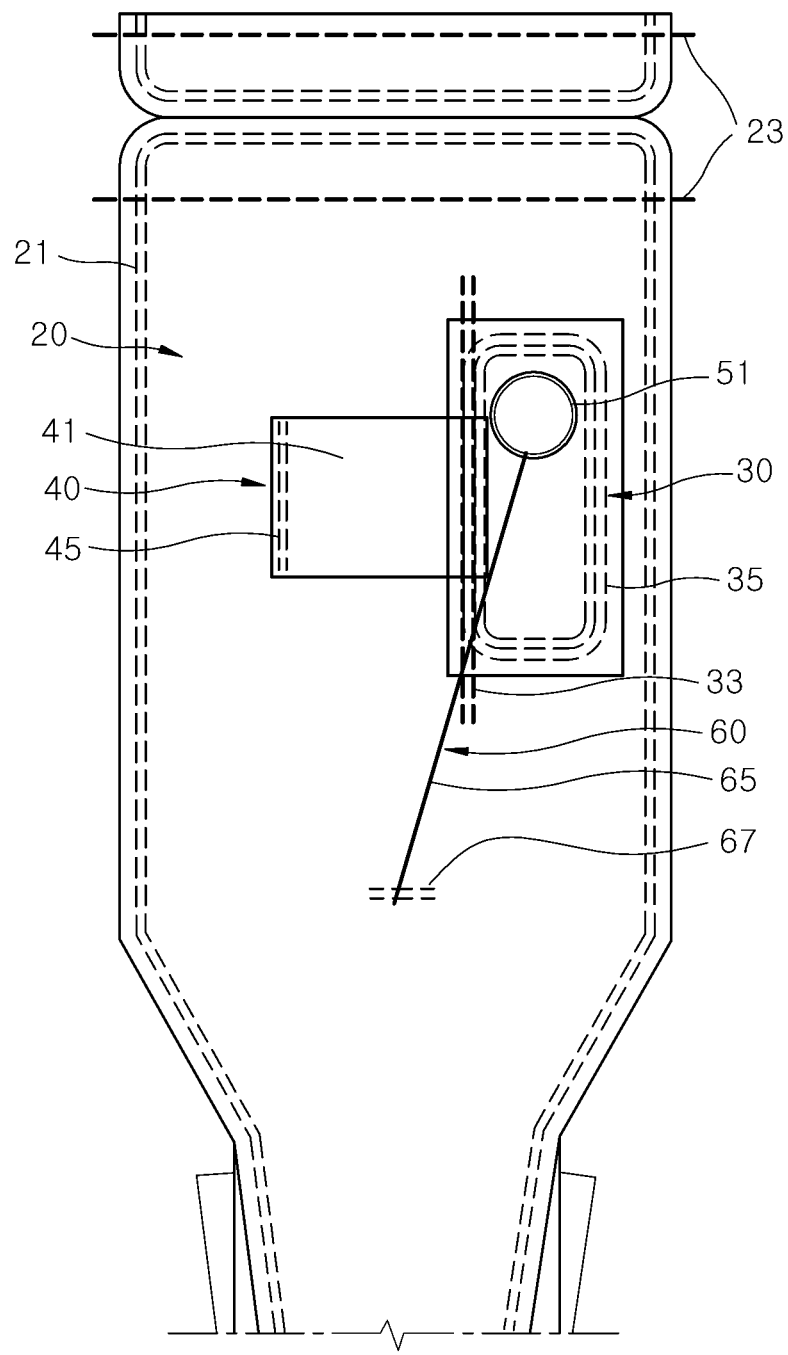
FIG. 3 illustrates that the airbag apparatus in accordance with the first exemplary embodiment of the present invention is unfolded.
Figure 4:
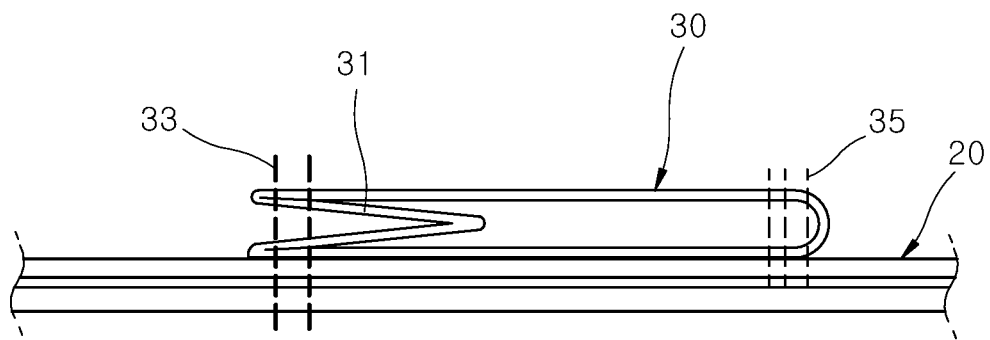
FIG. 4 is a cross-sectional view illustrating that a second chamber is folded and installed on a first chamber in the airbag apparatus in accordance with the first exemplary embodiment of the present invention.
Figure 5:
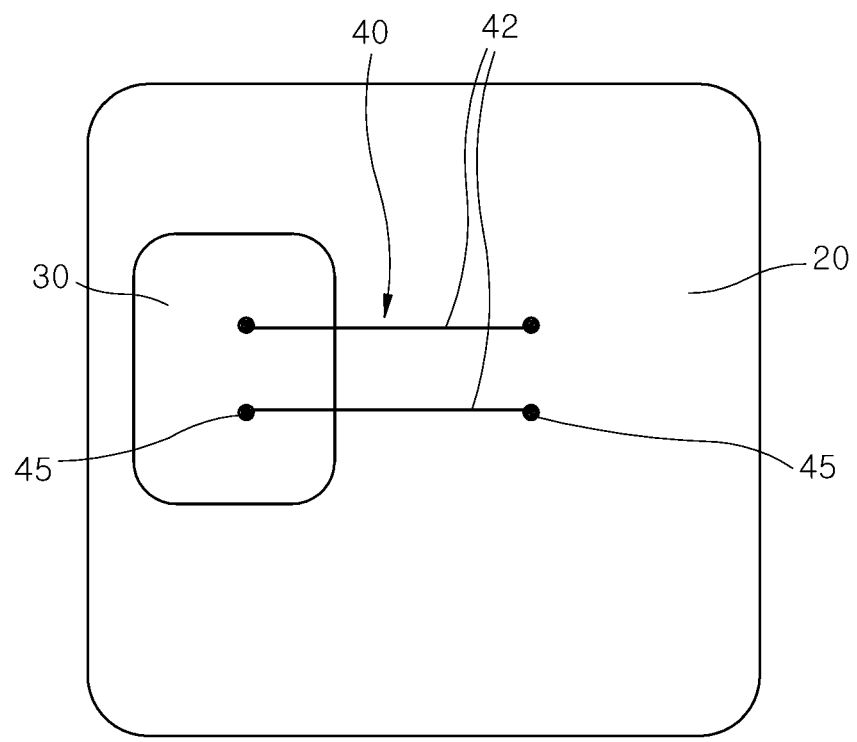
FIG. 5 is a front view illustrating another example of a connection tether in the airbag apparatus in accordance with the first exemplary embodiment of the present invention.

FIG. 1 is a plan view illustrating an airbag apparatus in accordance with a first embodiment of the present invention, FIG. 2 is a front view illustrating the airbag apparatus in accordance with the first embodiment of the present invention, FIG. 3 illustrates that the airbag apparatus in accordance with the first embodiment of the present invention is unfolded, FIG. 4 is a cross-sectional view illustrating that a second chamber is folded and installed on a first chamber in the airbag apparatus in accordance with the first embodiment of the present invention, and FIG. 5 is a front view illustrating another example of a connection tether in the airbag apparatus in accordance with the first embodiment of the present invention.

Referring to FIGS. 1 and 5, the airbag apparatus in accordance with the first embodiment of the present invention may include a first chamber 20, a second chamber 30, a communication tube 51 and a valve tether 60.

The first chamber 20 may be connected to the inflator 10, and support a head H in case of a head-on collision of a vehicle. When the first chamber 20 is completely deployed, the first chamber 20 may have a rectangular box shape. The first chamber 20 may be supported by an instrument panel (not illustrated) at the inner front of the vehicle.

The second chamber 30 may be connected to the first chamber 20 by a second sewed part 35. The second sewed part 35 may be formed in a rectangular frame shape along the edge of the second chamber 30.

The second chamber 30 may be connected to the rear of the first chamber 20 so as to be supported by the first chamber 20, and suppress the head H of a passenger from moving in a diagonal direction in case of an oblique collision of the vehicle. That is, the second chamber 30 may support one side of the head H while blocking the one side of the head H, in case of an oblique collision of the vehicle. Therefore, the head H of the passenger can be prevented from being pushed and turned to one side of the second chamber 30, which makes it possible to shorten the time required for holding the head H. Since a turn of the head H is prevented in case of an oblique collision of the vehicle, an injury of the head H or the neck can be prevented. Furthermore, although the size of the first chamber 20 is not increased or the increase of the size is minimized, it is possible to protect the head H of the passenger.

The second chamber 30 may be eccentrically disposed at the inboard side of the first chamber 20, in order to avoid a collision with the head H of the passenger in case of a head-on collision of the vehicle. The inboard side may indicate the widthwise center of the vehicle. The width of the second chamber 30 or the length of the second chamber 30 in the widthwise direction of the vehicle may be set to less than a half of the width of the first chamber 20. Thus, although the second chamber 30 is expanded and deployed rearward in case of a head-on collision of the vehicle, the head H can be prevented from being pushed rearward by the second chamber 30, which makes it possible to prevent the head from being injured or bent rearward by the second chamber 30.

The edge of the first chamber 20 may be sewed through a first sewed part 21. The top of the first chamber 20 may be sewed through a reinforcement sewed part 23. Since the top of the first chamber 20 is sewed through the reinforcement sewed part 23, the top of the first chamber 20 can be prevented from an external shock.

The second chamber 30 may be double-folded in such a manner that one side thereof is introduced to the inside, and an end portion of the double-folded part 31 of the second chamber 30 may be temporarily attached to the first chamber 20. The folded part 31 of the second chamber 30 may be formed by folding the second chamber 30 once or a plurality of times. The folded part 31 of the second chamber 30 may face the inboard side of the vehicle. Since the second chamber 30 is double-folded in such a manner that one side thereof is introduced to the inside, the length of the second chamber 30 can be increased more than when the second chamber 30 is installed without a folded part. Furthermore, since the expansion height of the second chamber 30 can be sufficiently increased when the second chamber 30 is expanded and deployed, the head H of a passenger can be rapidly held. Therefore, in case of an oblique collision of the vehicle, the head H of the passenger can be held by the second chamber 30, and thus prevented from turning or moving in a diagonal direction.

Since the folded part 31 of the second chamber 30 is temporarily attached to the first chamber 20, the temporary attachment part 33 may be torn when the second chamber 30 is expanded and deployed.

When the first chamber 20 is sewed, the folded part 31 of the second chamber 30 may be temporarily attached to the first chamber 20. Therefore, since the second chamber 30 can be temporarily attached to the first chamber 20 through one sewing process, it is possible to reduce the manufacturing time and cost of the airbag apparatus.

The valve tether 60 may be disposed obliquely toward the widthwise center of the first chamber 20. At this time, the valve tether 60 may be fixed to the first chamber 20 by a valve sewed part 67. When the first chamber 20 has a constant expansion height, the installation length of the valve tether 60 may be increased in the case where the valve tether 60 is installed obliquely toward the center of the second chamber 30. Furthermore, when the valve tether 60 is installed perpendicular to the first chamber 20, the installation length of the valve tether 60 may be decreased.

When the length of a tether puller 65 is too small, the communication tube 51 may be closed before the first chamber 20 is completely deployed. On the other hand, when the length of the tether puller 65 is too large, the communication tube 51 may not be completely closed even after the deployment of the first chamber 20 is completed. In the first embodiment of the present invention, since the tether puller 65 is disposed obliquely toward the widthwise center of the first chamber 20, the installation length of the tether puller 65 can be adjusted in consideration of the expansion height of the first chamber 20. Therefore, the tether puller 65 may be installed so as to completely close the communication tube 51 when the deployment of the first chamber 20 is completed.

The airbag apparatus may further include a connection tether 40 which connects the first and second chambers 20 and 30 so as to restrict the second chamber 30 from leaning to the inboard side, when the second chamber 30 is deployed. At this time, one end of the connection tether 40 may be connected to a position separated from the second chamber 30 in the first chamber 20 or connected to the second sewed part 35 of the second chamber 30. The connection tether 40 may apply a tensile force to the second chamber 30 to pull the second chamber 30 toward the first chamber 20, when the first and second chambers 20 and 30 are expanded.

In case of an oblique collision of the vehicle, the connection tether 40 and the second chamber 30 may be deformed in a stepwise manner while absorbing the load of the head H. That is, the head H may be primarily held by the connection tether 40, and then secondarily held by the second chamber 30. Therefore, since the time required for holding the head H is shortened in case of an oblique collision of the vehicle, an injury of the head H or the neck can be prevented.

When the head H is moved obliquely in a diagonal direction of the vehicle in case of an oblique collision of the vehicle, the connection tether 40 can pull the second chamber 30 toward the first chamber 20 using a support force (reaction force) of the first chamber 20, thereby preventing the head H from separating from the second chamber 30. Therefore, although the sizes of the first and second chambers 20 and 30 are not increased, it is possible to protect the head H.

When the head H applies a load to the connection tether 40 and the first chamber 20 in case of a head-on collision of the vehicle, the connection tether 40 and the first chamber 20 may absorb the load of the head H in a stepwise manner. At this time, when the first chamber 20 is contracted forward by the load of the head H, the load of the head H can be buffered by the tensile force of the connection tether 40 and the reaction force of the second chamber 30 because the reaction force of the second chamber 30 pulls the connection tether 40.

The connection tether 40 may be disposed at the rears of the first and second chambers 20 and 30 such that the head H comes in contact with the connection tether 40. Therefore, when the head H collides with the first or second chamber 20 or 30, the connection tether 40 can primarily buffer the load of the head H.

The connection tether 40 may include a surface tether 41 which partially covers the rear surface of the first chamber 20 and the rear surface of the second chamber 30 (refer to FIG. 2). The rear surface of the first chamber 20 and the rear surface of the second chamber 30 may come in direct contact with the head H. Both sides of the surface tether 41 may be connected to the first and second chambers 20 and 30 by connection sewed parts 45. The surface tether 41 may indicate a rectangular or elliptical tether of which the width is smaller than the length. When the connection tether 40 is the surface tether 41, the surface tether 41 may uniformly come in contact with a colliding part of the head H, which makes it possible to prevent concentration of pressure on a specific part of the head H. Therefore, the head H can be prevented from being injured by the connection tether 40.

The connection tether 40 may include a plurality of line tethers 42 which connect the first and second chambers 20 and 30 (refer to FIG. 5). Alternatively, the connection tether 40 may include one line tether 42 which connects the first and second chambers 20 and 30. Both sides of the line tether 42 may be connected to the first and second chambers 20 and 30 by the connection sewed parts 45. The line tether 42 may indicate a string-type or band-type tether formed in an elongated shape. The number of line tethers 42 may be appropriately designed depending on the heights of the first and second chambers 20 and 30 or the size of the vehicle.

Hereafter, a first example of the valve tether in the airbag apparatus in accordance with the first embodiment of the present invention will be described.

Figure 6:
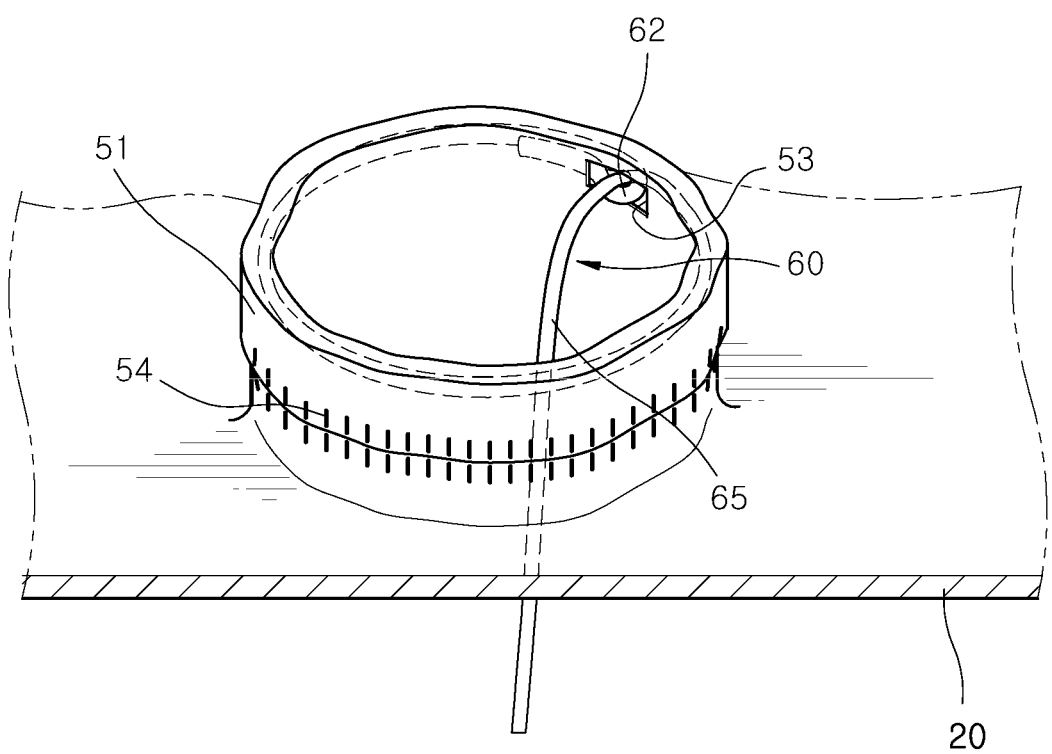
FIG. 6 is a perspective view illustrating a first example of a valve tether in the airbag apparatus in accordance with the first exemplary embodiment of the present invention.
Figure 7:
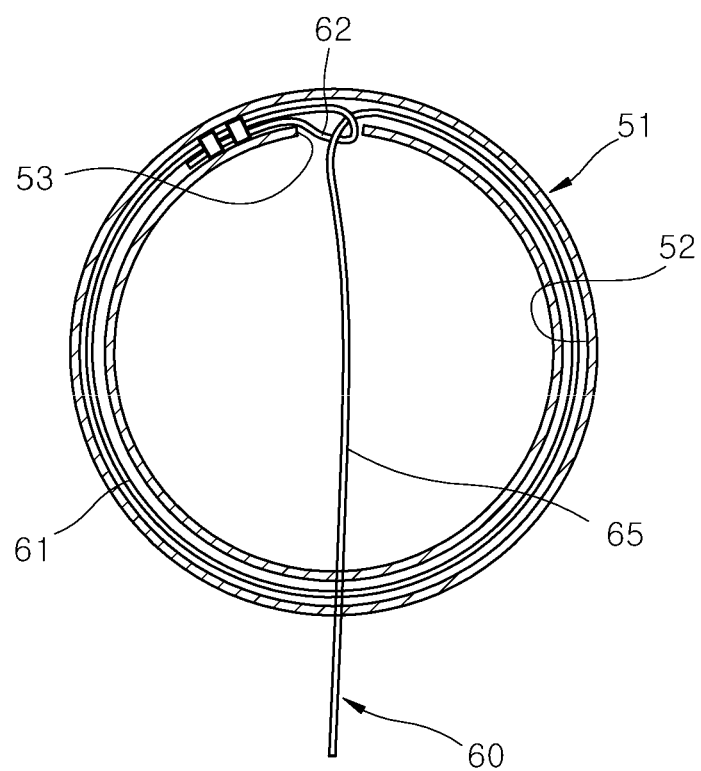
FIG. 7 is a cross-sectional view illustrating the first example of the valve tether in the airbag apparatus in accordance with the first exemplary embodiment of the present invention.
Figure 8:
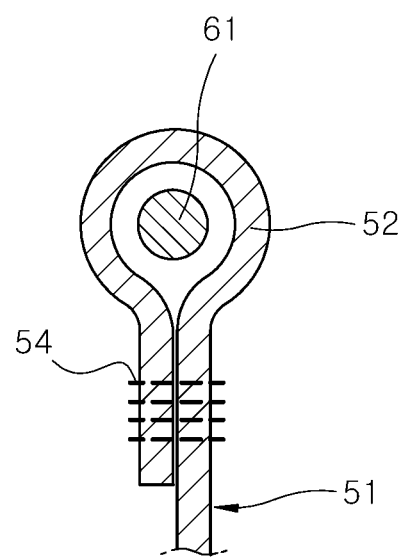
FIG. 8 is a longitudinal sectional view illustrating the first example of the valve tether in the airbag apparatus in accordance with the first exemplary embodiment of the present invention.
Figure 9:
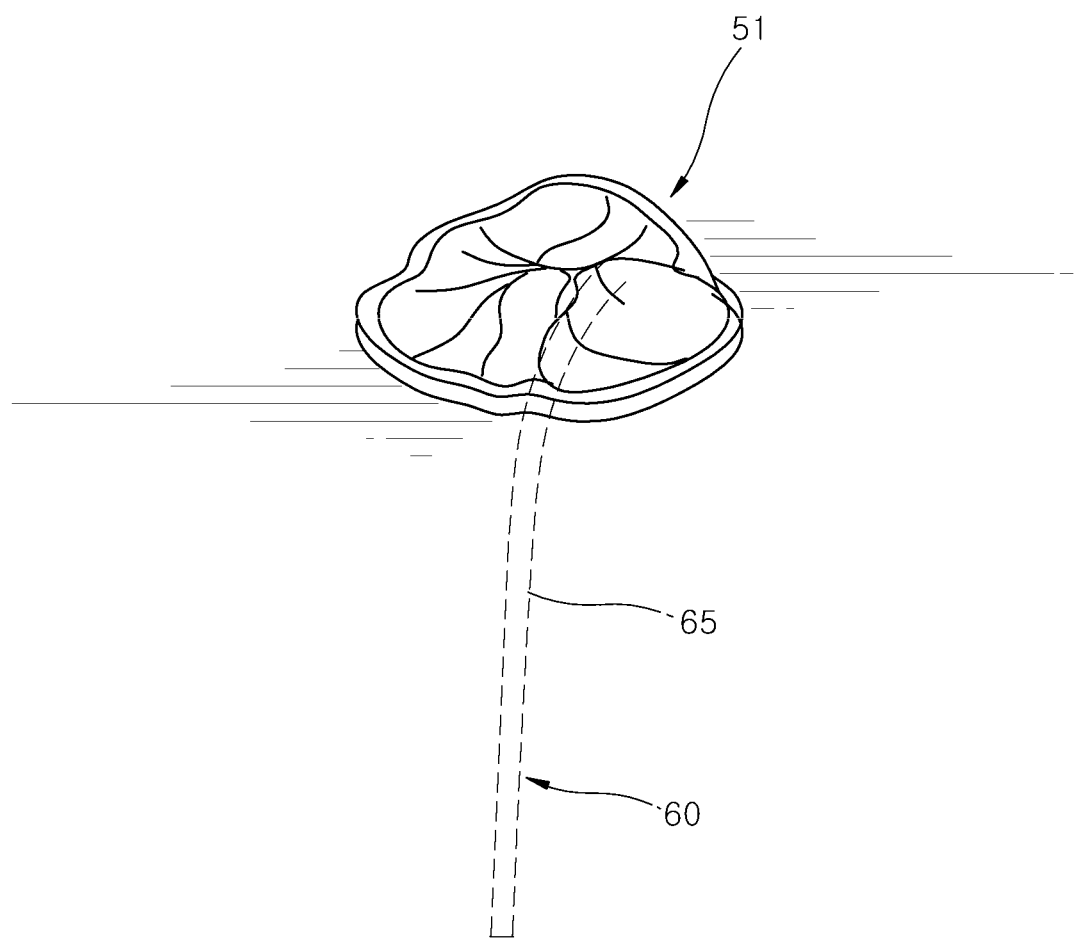
FIG. 9 is a perspective view illustrating that a communication tube is closed by the first example of the valve tether in the airbag apparatus in accordance with the first exemplary embodiment of the present invention.

FIG. 6 is a perspective view illustrating a first example of the valve tether in the airbag apparatus in accordance with the first embodiment of the present invention, FIG. 7 is a cross-sectional view illustrating the first example of the valve tether in the airbag apparatus in accordance with the first embodiment of the present invention, FIG. 8 is a longitudinal sectional view illustrating the first example of the valve tether in the airbag apparatus in accordance with the first embodiment of the present invention, and FIG. 9 is a perspective view illustrating that the communication tube is closed by the first example of the valve tether in the airbag apparatus in accordance with the first embodiment of the present invention.

Referring to FIGS. 6 to 9, the communication tube 51 may have a ring-shaped tightening channel 52 formed at the circumference thereof. The communication tube 51 may be formed of the same material as the first chamber 20. Alternatively, the communication tube 51 may be formed of a different material from the first chamber 20, and then sewed to the first chamber 20. The communication tube 51 may be formed in various shapes such as a cylindrical shape and polygonal cylinder shape.

The communication tube 51 may be formed on the first chamber 20 so as to introduce gas of the first chamber 20 to the second chamber 30, and the ring-shaped tightening channel 52 may be formed along the circumference of the communication tube 51. The tightening channel 52 may be formed through a series of processes of doubling an end portion of the communication tube 51 in the longitudinal direction of the communication tube 51 and connecting the communication tube 51 to the first chamber 20 through the channel sewed part 54.

The tightening channel 52 may have a through-hole 53 through which the tether puller 65 is drawn to the outside of the tightening channel 52. When the tether puller 65 pulls a tether ring 61, the tether ring 61 may tighten and close the communication tube 51 while being drawn through the through-hole 53.

The valve tether 60 may include the tether ring 61 and the tether puller 65.

The tether ring 61 may be installed through the inside of the tightening channel 52. The tether ring 61 may have a tightening ring 62 formed at one side thereof, such that the tether puller 65 passes through the tightening ring 62. At this time, the tightening ring 62 may be formed through a series of processes of doubling one side of the tether ring 61 and sewing the doubled portion of the tether ring 61 or fixing the doubled portion of the tether ring 61 using a clip or the like. The tightening ring 62 may be movably installed in the tightening channel 52. Therefore, when the tether puller 65 is pulled, the tightening ring 62 can be moved in the tightening channel 52.

The tether puller 65 may be connected to the other side of the tether ring 61 so as to pull the tether ring 61. The tether puller 65 may be connected to the first chamber 20 so as to close the communication tube 51 by pulling the tether ring 61 in one direction when the first chamber 20 is completely deployed.

Since the tether puller 65 closes the communication tube 51 by pulling the tether ring 61, the tether ring 61 can tighten the communication tube 51, thereby preventing the spread of the communication tube 51. Thus, while gas leakage from the second chamber 30 is prevented, a reduction in expensive force (support force) of the second chamber 30 can be prevented. Therefore, in case of a collision with the head H, the support force of the second chamber 30 can be increased while the head H is suppressed from moving in a diagonal direction.

Hereafter, a second example of the valve tether in the airbag apparatus in accordance with the first embodiment of the present invention will be described.

Figure 10:
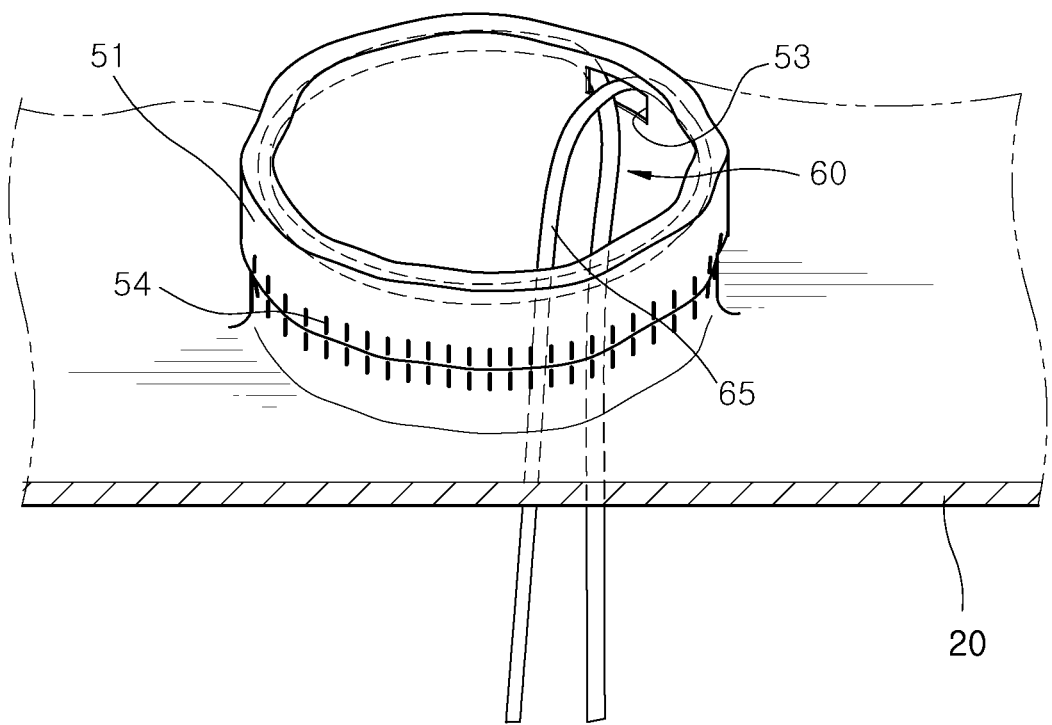
FIG. 10 is a perspective view illustrating a second example of the valve tether in the airbag apparatus in accordance with the first exemplary embodiment of the present invention.
Figure 11:
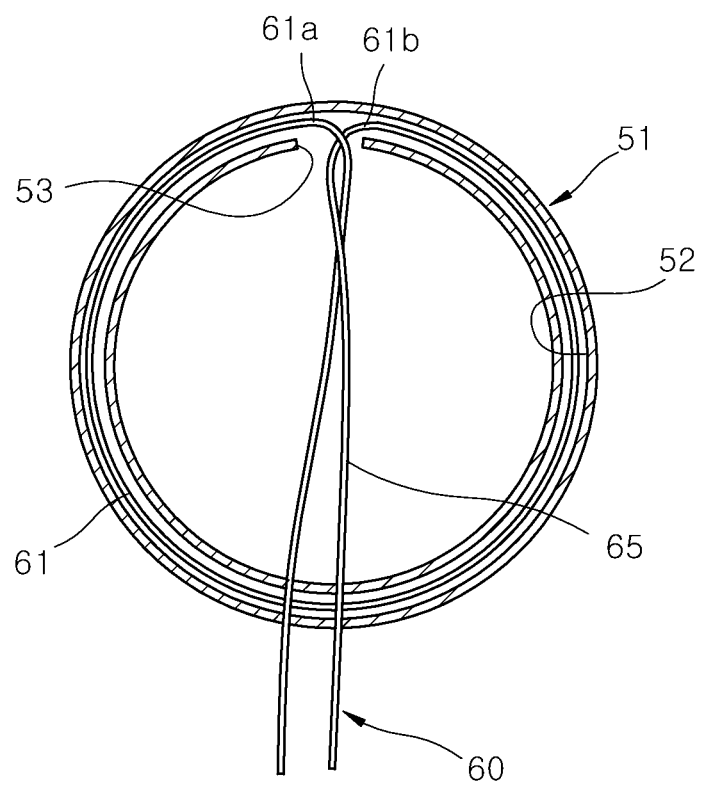
FIG. 11 is a cross-sectional view illustrating the second example of the valve tether in the airbag apparatus in accordance with the first exemplary embodiment of the present invention.

FIG. 10 is a perspective view illustrating a second example of the valve tether in the airbag apparatus in accordance with the first embodiment of the present invention, and FIG. 11 is a cross-sectional view illustrating the second example of the valve tether in the airbag apparatus in accordance with the first embodiment of the present invention.

Referring to FIGS. 10 and 11, the valve tether 60 may include the tether ring 61 and the pair of tether pullers 65.

The tether ring 61 may be installed through the inside of the tightening channel 52. The pair of tether pullers 65 may be connected to both ends 61a and 61b of the tether ring 61 so as to pass through the through-hole 53. The pair of tether pullers 65 may be fixed to the first chamber 20 by the valve sewed part 67.

Since the pair of tether puller 65 closes the communication tube 51 by pulling both ends 61a and 61b of the tether ring 61 at the same time, the length of the drawn tether ring 61 may be doubled even though the first chamber 20 is expanded to the same height. Therefore, since the tether ring 61 is pulled by the pair of tether pullers 65 at the same time, the valve tether 60 in accordance with the second example can tighten the communication tube 51 twice faster than the valve tether 60 which pulls the tether ring 61 using one tether puller 65.

Since the tether pullers 65 close the communication tube 51 by pulling both ends 61a and 61b of the tether ring 61, the tether ring 61 can tighten the communication tube 51, thereby preventing the spread of the communication tube 51. Therefore, while gas leakage from the second chamber 30 is prevented, a reduction in expensive force (support force) of the second chamber 30 can be prevented.

Hereafter, a third example of the valve tether in the airbag apparatus in accordance with the first embodiment of the present invention will be described.

Figure 12:
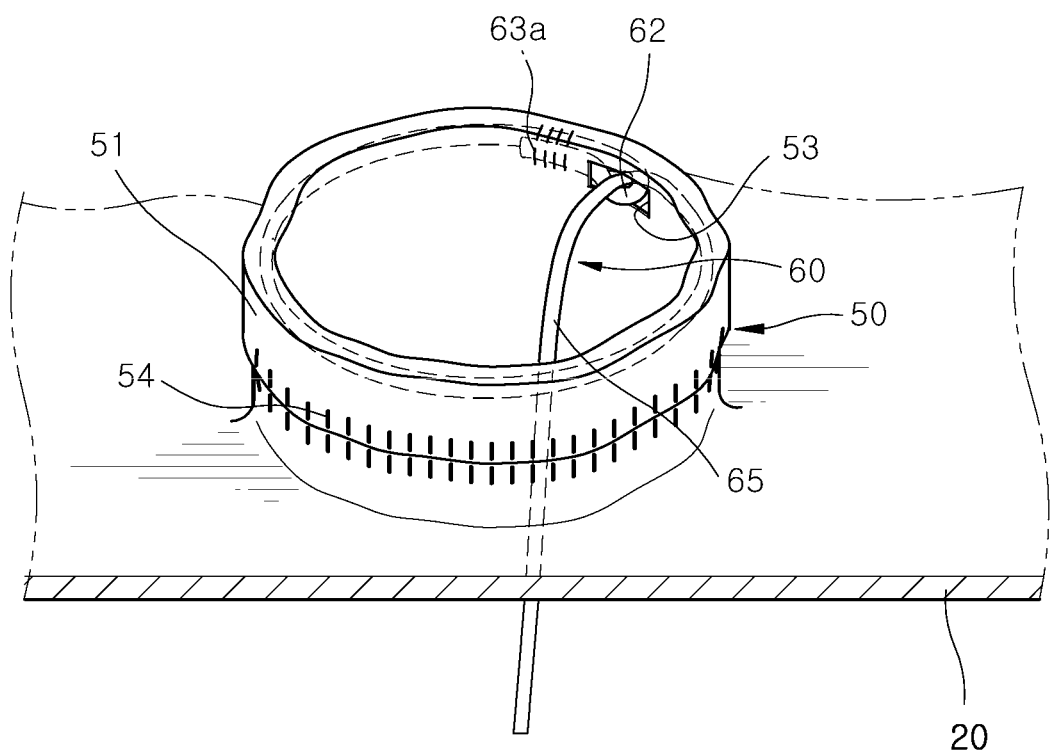
FIG. 12 is a perspective view illustrating a third example of the valve tether in the airbag apparatus in accordance with the first exemplary embodiment of the present invention.
Figure 13:
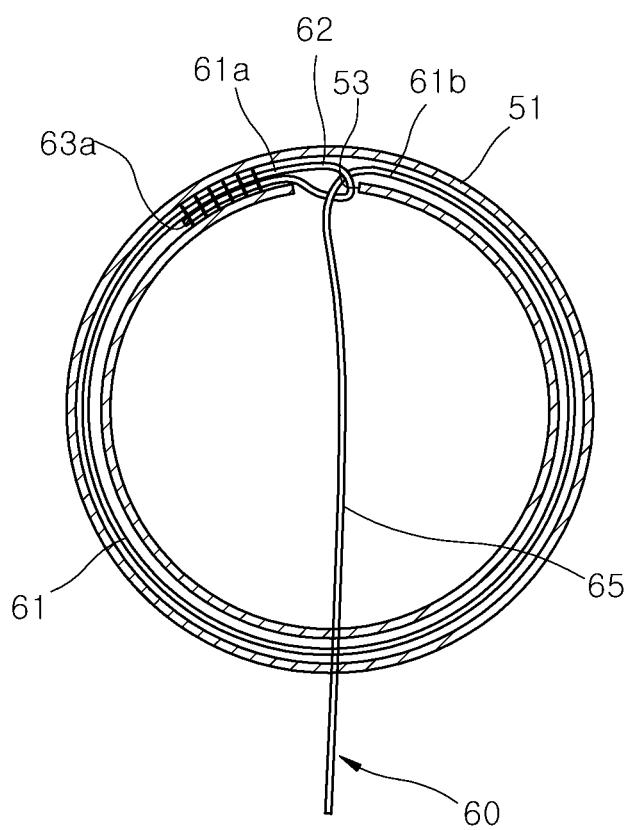
FIG. 13 is a cross-sectional view illustrating the third example of the valve tether in the airbag apparatus in accordance with the first exemplary embodiment of the present invention.

FIG. 12 is a perspective view illustrating a third example of the valve tether in the airbag apparatus in accordance with the first embodiment of the present invention, and FIG. 13 is a cross-sectional view illustrating the third example of the valve tether in the airbag apparatus in accordance with the first embodiment of the present invention.

Referring to FIGS. 12 and 13, the valve tether 60 may include the tether ring 61 and the tether puller 65.

The tether ring 61 may be installed through the inside of the tightening channel 52. The tether ring 61 may have a tightening ring 62 formed at one side thereof, such that the tether puller 65 passes through the tightening ring 62. At this time, the tightening ring 62 may be formed through a series of processes of doubling one side of the tether ring 61 and sewing the doubled portion of the tether ring 61 or fixing the doubled portion of the tether ring 61 using a clip or the like. The tightening ring 62 may be fixed to the tightening channel 52 by a first fixing sewed portion 63a. Therefore, when the tether puller 65 is pulled, the tightening ring 62 can be prevented from moving in the tightening channel 52.

The tether puller 65 may be connected to the other side of the tether ring 61 so as to pull the tether ring 61. The tether puller 65 may be connected to the first chamber 20 so as to close the communication tube 51 by pulling the tether ring 61 in one direction when the first chamber 20 is completely deployed.

Since the tether puller 65 closes the communication tube 51 by pulling the tether ring 61, the tether ring 61 can tighten the communication tube 51, thereby preventing the spread of the communication tube 51. Therefore, while gas leakage from the second chamber 30 is prevented, a reduction in expensive force (support force) of the second chamber 30 can be prevented.

Hereafter, a fourth example of the valve tether in the airbag apparatus in accordance with the embodiment of the present invention will be described.

Figure 14:
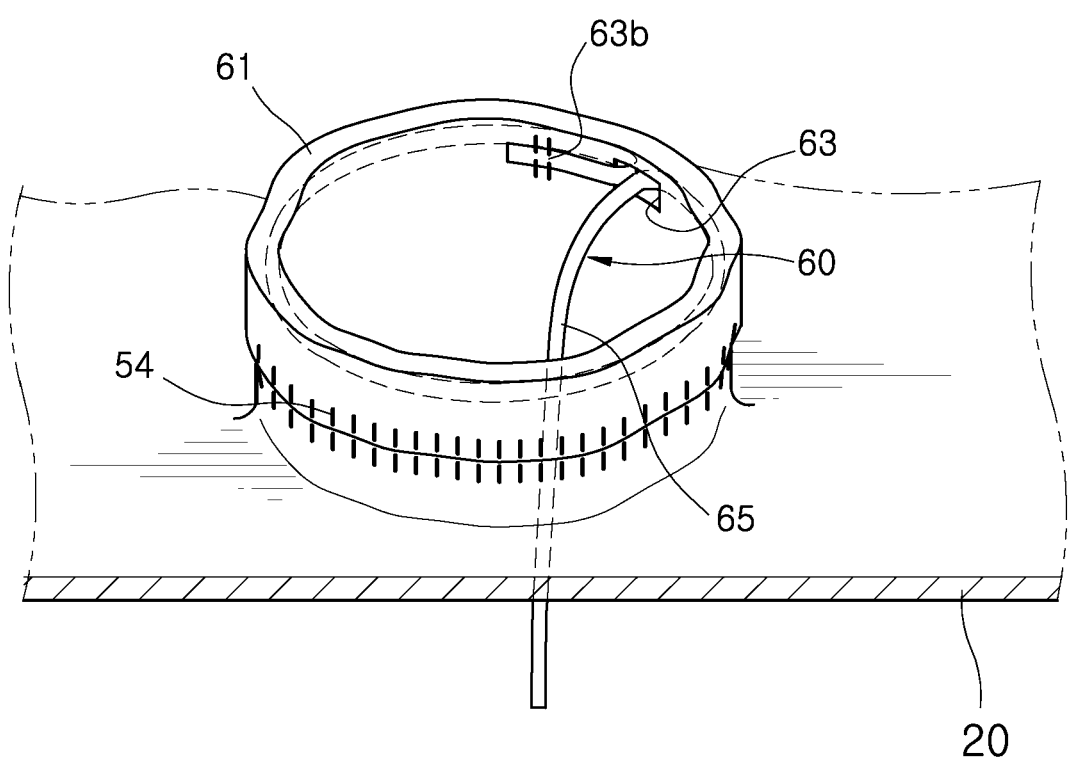
FIG. 14 is a perspective view illustrating a fourth example of the valve tether in the airbag apparatus in accordance with the first exemplary embodiment of the present invention.
Figure 15:
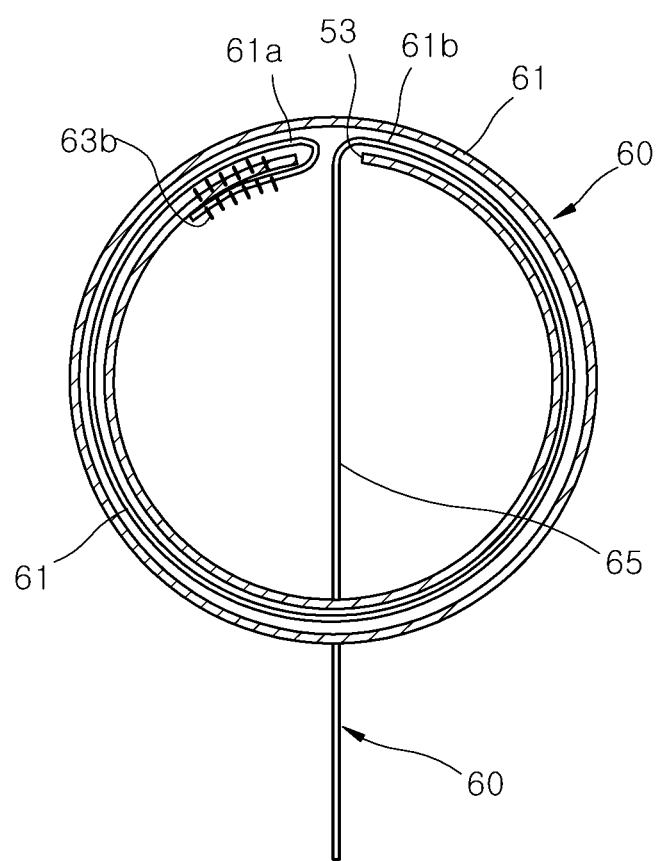
FIG. 15 is a cross-sectional view illustrating the fourth example of the valve tether in the airbag apparatus in accordance with the first exemplary embodiment of the present invention.

FIG. 14 is a perspective view illustrating a fourth example of the valve tether in the airbag apparatus in accordance with the first embodiment of the present invention, and FIG. 15 is a cross-sectional view illustrating the fourth example of the valve tether in the airbag apparatus in accordance with the first embodiment of the present invention.

Referring to FIGS. 14 and 15, the valve tether 60 may include the tether ring 61 and the tether puller 65.

The tether ring 61 may be installed through the inside of the tightening channel 52. One side of the tether ring 61 may be fixed to the tightening channel 52 by a second fixing sewed portion 63b. Therefore, although the tether ring 61 is pulled by the tether puller 65, one side of the tether ring 61 may not be moved in the tightening channel 52.

The tether puller 65 may be connected to the other side of the tether ring 61 so as to pull the tether ring 61. The tether puller 65 may be connected to the first chamber 20 so as to close the communication tube 51 by pulling the tether ring 61 in one direction when the first chamber 20 is deployed.

Since the tether puller 65 closes the communication tube 51 by pulling the tether ring 61 in one direction, the tether ring 61 can tighten the communication tube 51, thereby preventing the spread of the communication tube 51. Therefore, while gas leakage from the second chamber 30 is prevented, a reduction in expensive force (support force) of the second chamber 30 can be prevented.

Hereafter, a fifth example of the valve tether in the airbag apparatus in accordance with the first embodiment of the present invention will be described.

Figure 16:
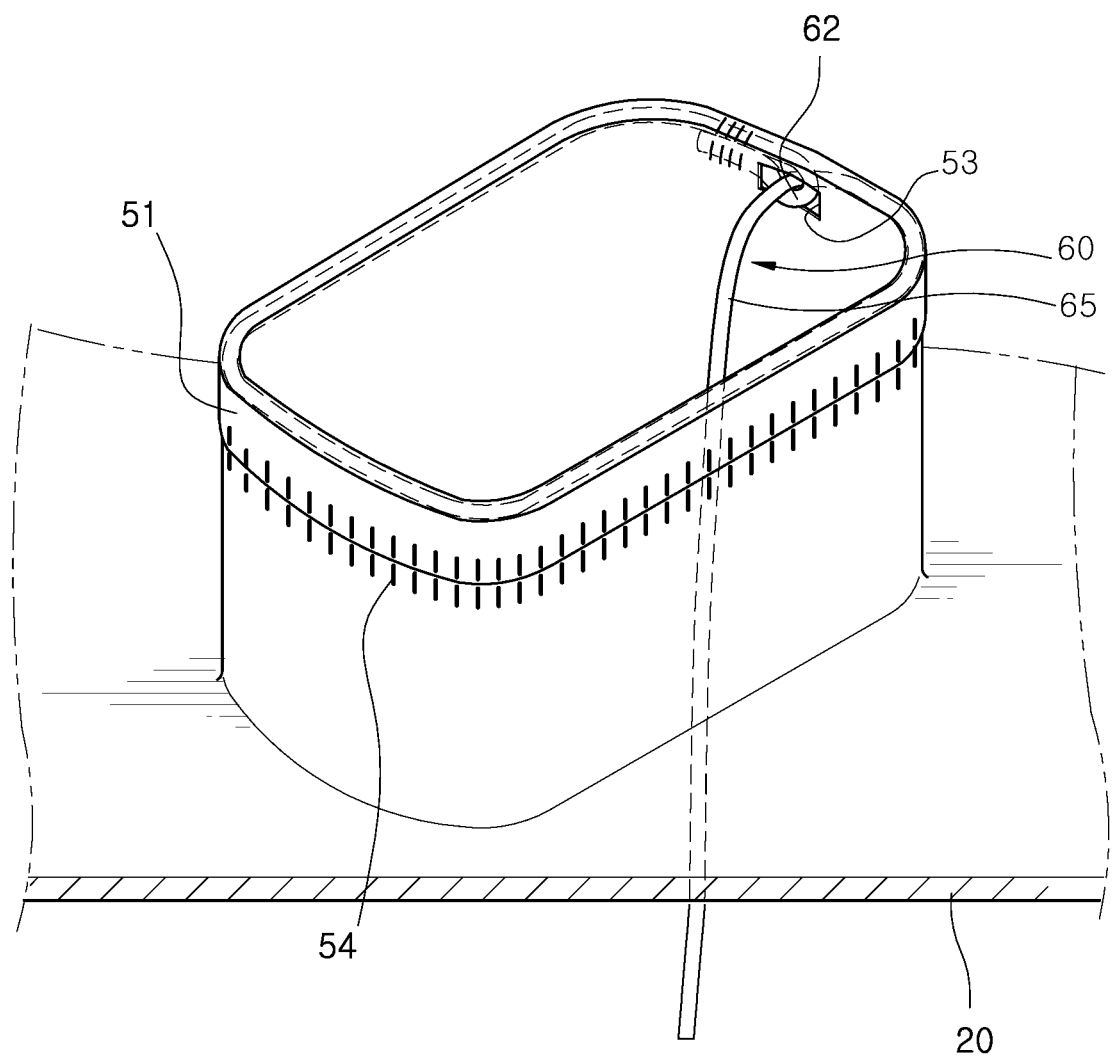
FIG. 16 is a perspective view illustrating a fifth example of the valve tether in the airbag apparatus in accordance with the first exemplary embodiment of the present invention.
Figure 17:
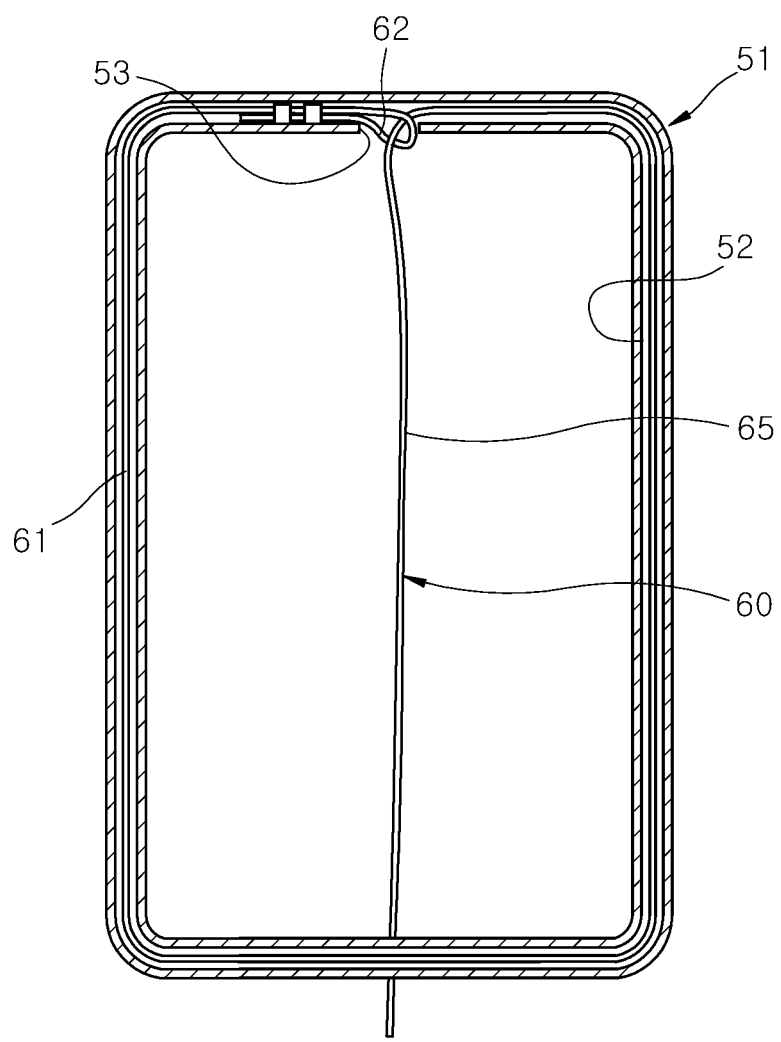
FIG. 17 is a cross-sectional view illustrating the fifth example of the valve tether in the airbag apparatus in accordance with the first exemplary embodiment of the present invention.
Figure 18:
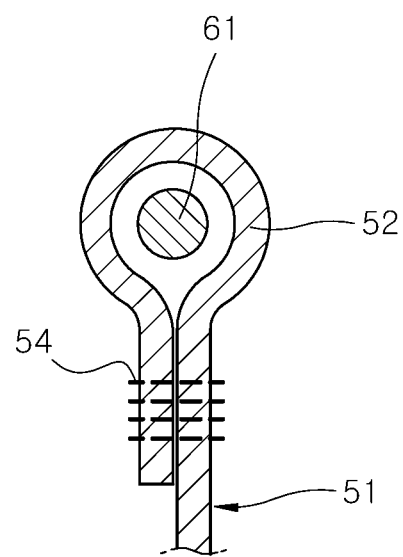
FIG. 18 is a longitudinal sectional view illustrating the fifth example of the valve tether in the airbag apparatus in accordance with the first exemplary embodiment of the present invention.
Figure 19:
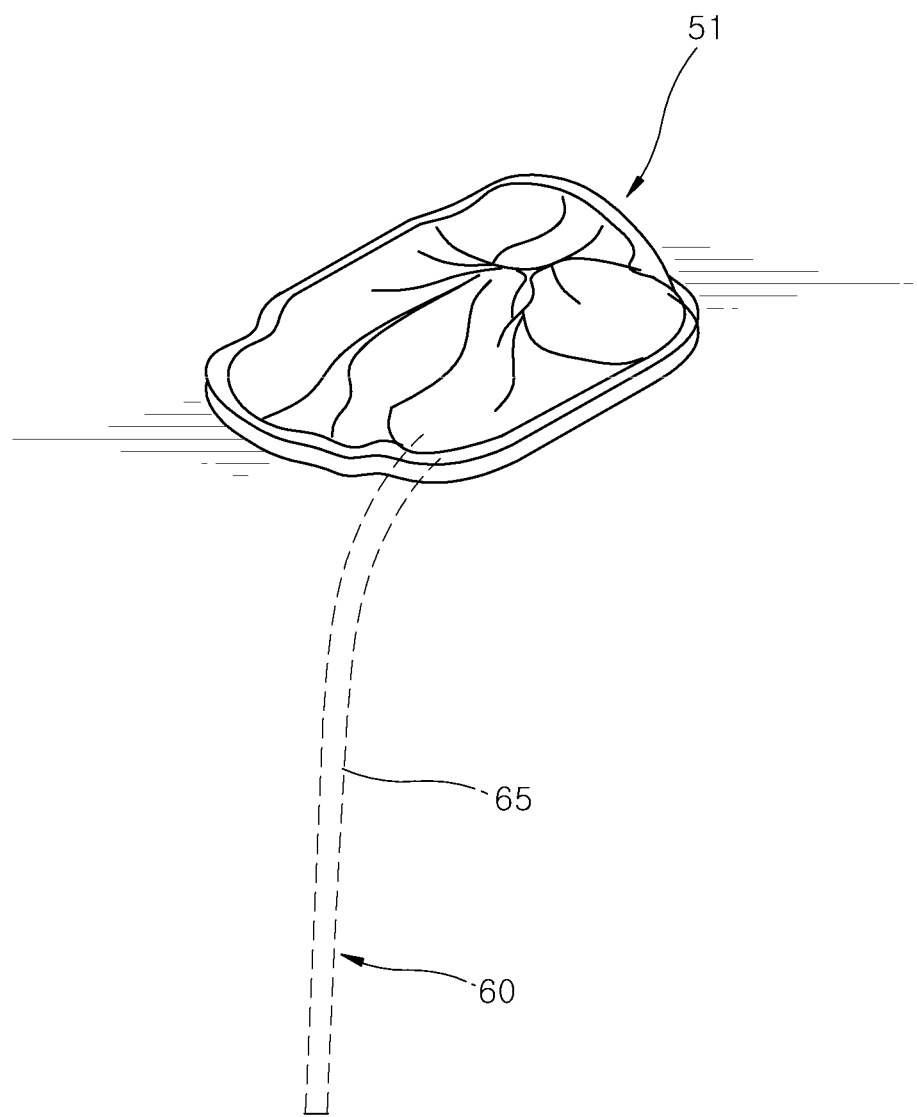
FIG. 19 is a perspective view illustrating that the communication tube is closed by the fifth example of the valve tether in the airbag apparatus in accordance with the first exemplary embodiment of the present invention.

FIG. 16 is a perspective view illustrating a fifth example of the valve tether in the airbag apparatus in accordance with the first embodiment of the present invention, FIG. 17 is a cross-sectional view illustrating the fifth example of the valve tether in the airbag apparatus in accordance with the first embodiment of the present invention, FIG. 18 is a longitudinal sectional view illustrating the fifth example of the valve tether in the airbag apparatus in accordance with the first embodiment of the present invention, and FIG. 19 is a perspective view illustrating that the communication tube is closed by the fifth example of the valve tether in the airbag apparatus in accordance with the first embodiment of the present invention.

Referring to FIGS. 16 to 19, the communication tube 51 may be formed of the same material as the first chamber 20. Alternatively, the communication tube 51 may be formed of a different material from the first chamber 20, and then sewed to the first chamber 20.

The communication tube 51 may be formed in a polygonal shape on the first chamber 20 so as to introduce gas of the first chamber 20 into the second chamber 30, and the tightening channel 52 may be formed along the edge of the communication tube 51. For example, the communication tube 51 may be formed in a rectangular shape corresponding to the shape of the second chamber 30.

Since the communication tube 51 is formed in a rectangular box shape, the gas can be uniformly supplied to the second chamber 30 deployed in a rectangular box shape. Furthermore, the communication tube 51 may be formed in a rectangular shape when the second chamber 30 is formed in a rectangular shape, or formed in a square shape when the second chamber 30 is formed in a square shape.

The tightening channel 52 may be formed in a rectangular frame shape at the end of the communication tube 51. Since the tightening channel 52 is formed in a rectangular frame shape corresponding to the shape of the communication tube 51, the amount of gas introduced into the communication tube 51 can be increased.

The tightening channel 52 may be formed through a series of processes of doubling the end portion of the communication tube 51 in the longitudinal direction of the communication tube 51 and connecting the doubled portion of the communication tube 51 using the channel sewed part 54.

The tightening channel 52 may have a through-hole 53 through which the tether puller 65 is drawn to the outside of the tightening channel 52. When the tether puller 65 pulls the tether ring 61, the tether ring 61 may tighten and close the communication tube 51 while drawn through the through-hole 53.

The valve tether 60 may include the tether ring 61 and the tether puller 65.

The tether ring 61 may be installed through the inside of the tightening channel 52. The tether ring 61 may have a tightening ring 62 formed at one side thereof, such that the tether puller 65 passes through the tightening ring 62. At this time, the tightening ring 62 may be formed through a series of processes of doubling one side of the tether ring 61 and sewing the doubled portion of the tether ring 61 or fixing the doubled portion of the tether ring 61 using a clip or the like. The tightening ring 62 may be movably installed in the tightening channel 52. Therefore, when the tether puller 65 is pulled, the tightening ring 62 may be moved in the tightening channel 52. Furthermore, the tightening ring 62 may be fixed by a fixing sewed part (not illustrated) so as not to be moved in the tightening channel 52.

The tether puller 65 may be connected to the other side of the tether ring 61 so as to pull the tether ring 61. The tether puller 65 may be connected to the first chamber 20 so as to close the communication tube 51 by pulling the tether ring 61 in one direction when the first chamber 20 is completely deployed.

Since the tether puller 65 closes the communication tube 51 by pulling the tether ring 61, the tether ring 61 can tighten the communication tube 51, thereby preventing the spread of the communication tube 51. Thus, while gas leakage from the second chamber 30 is prevented, a reduction in expensive force (support force) of the second chamber 30 can be prevented. Therefore, the support force of the second chamber 30 can be increased in case of a collision with the head H, while the head H is suppressed from moving in a diagonal direction.

Hereafter, a sixth example of the valve tether in the airbag apparatus in accordance with the embodiment of the present invention will be described. The sixth example may have substantially the same structure as the fifth example, except for the installation structure of the valve tether.

Figure 20:
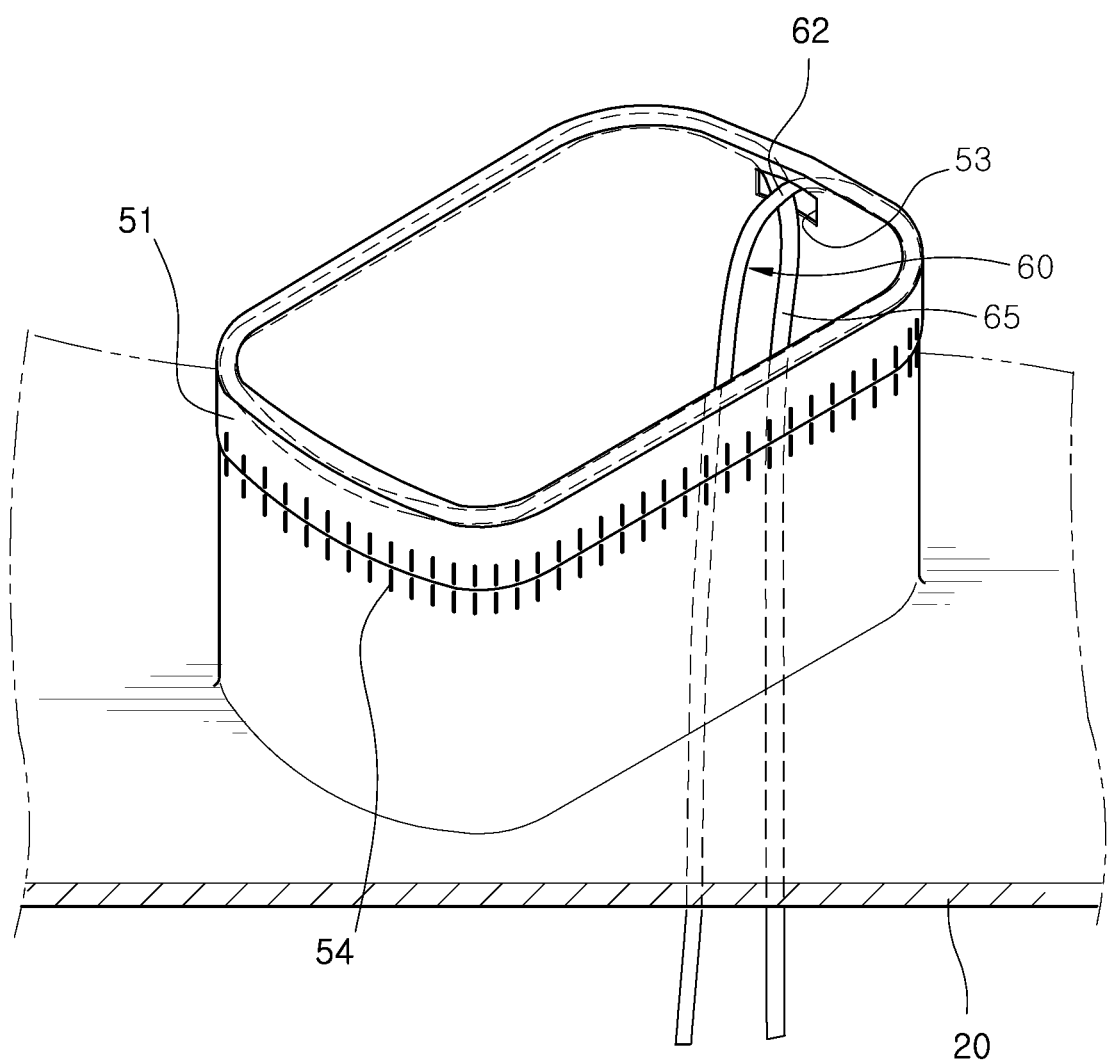
FIG. 20 is a perspective view illustrating a sixth example of the valve tether in the airbag apparatus in accordance with the first exemplary embodiment of the present invention.
Figure 21:
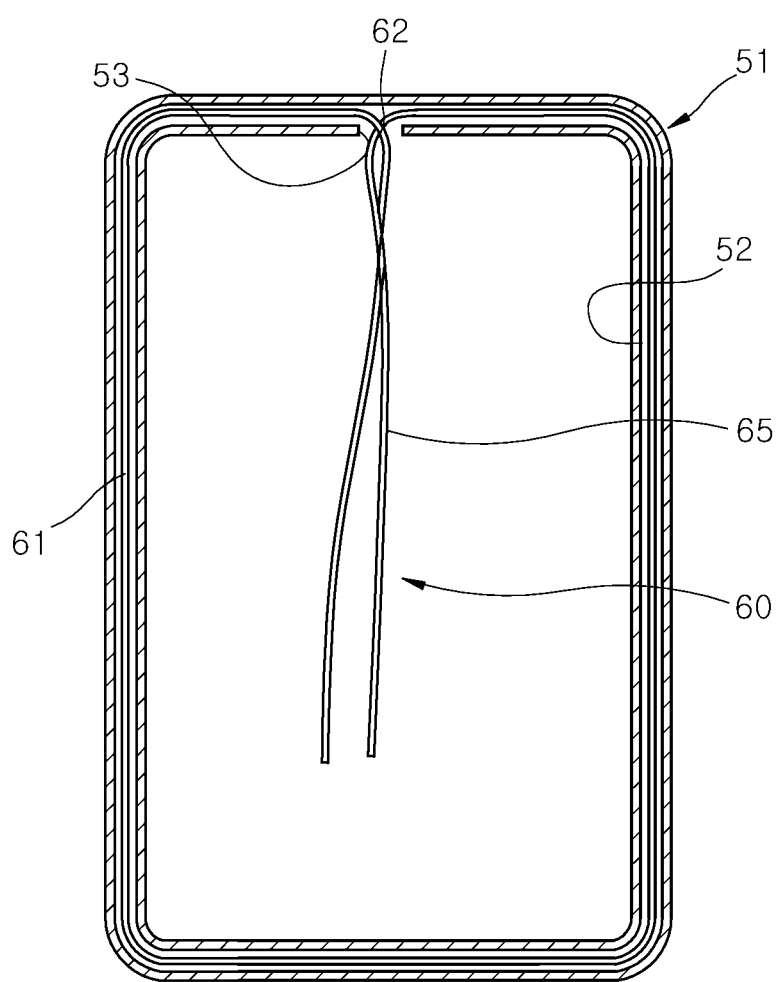
FIG. 21 is a cross-sectional view illustrating the sixth example of the valve tether in the airbag apparatus in accordance with the first exemplary embodiment of the present invention.

FIG. 20 is a perspective view illustrating the sixth example of the valve tether in the airbag apparatus in accordance with the first embodiment of the present invention, and FIG. 21 is a cross-sectional view illustrating the sixth example of the valve tether in the airbag apparatus in accordance with the first embodiment of the present invention.

Referring to FIGS. 20 and 21, the valve tether 60 may include the tether ring 61 and the pair of tether pullers 65.

The tether ring 61 may be installed through the inside of the tightening channel 52. The pair of tether pullers 65 may be connected to both ends of the tether ring 61 so as to pass through the through-hole 53. The pair of tether pullers 65 may be fixed to the first chamber 20 by the valve sewed part 67.

Since the pair of tether pullers 65 closes the rectangular communication tube 51 by pulling both ends 61a and 61b of the tether ring 61 at the same time, the length of the drawn tether ring 61 may be doubled even though the first chamber 20 is expanded to the same height.

Therefore, since the tether ring 61 is pulled by the pair of tether pullers 65 at the same time, the valve tether 60 in accordance with the sixth example can tighten the communication tube 51 twice faster than the valve tether 60 which pulls the tether ring 61 using one tether puller 65. Furthermore, although the communication tube 51 having a rectangular frame shape is formed in a sufficient size, the communication tube 51 can be rapidly closed because both ends of the valve tether 60 are pulled at the same time. Furthermore, while gas leakage from the second chamber 30 is prevented, a reduction in expensive force (support force) of the second chamber 30 can be prevented.

The operation of the airbag apparatus in accordance with the first embodiment of the present invention will be described. Hereafter, the operations of the airbag apparatus in case of an oblique collision and head-on collision of the vehicle will be sequentially described.

First, the operation of the airbag apparatus in case of an oblique collision of the vehicle will be described.

Figure 22:
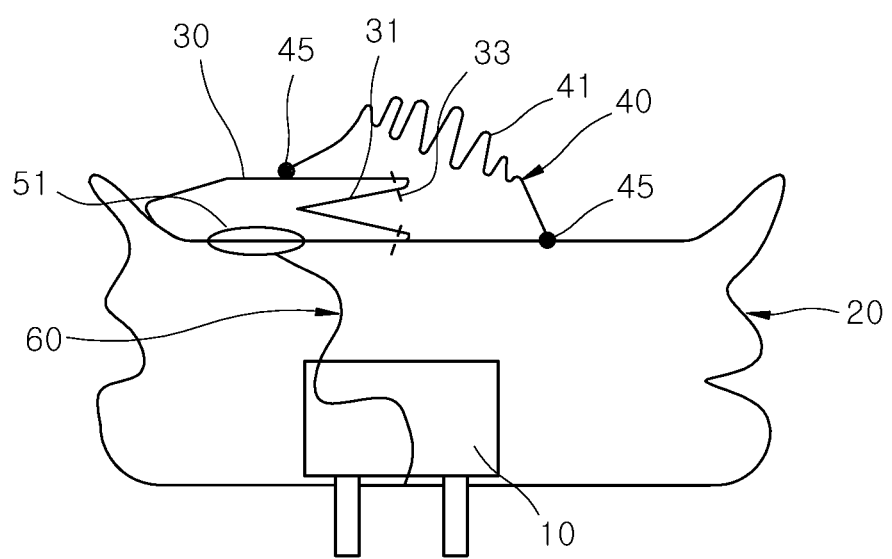
FIG. 22 illustrates that a temporary attachment part of the second chamber in the airbag apparatus in accordance with the exemplary first embodiment of the present invention is torn in case of an oblique collision of the vehicle.
Figure 23:
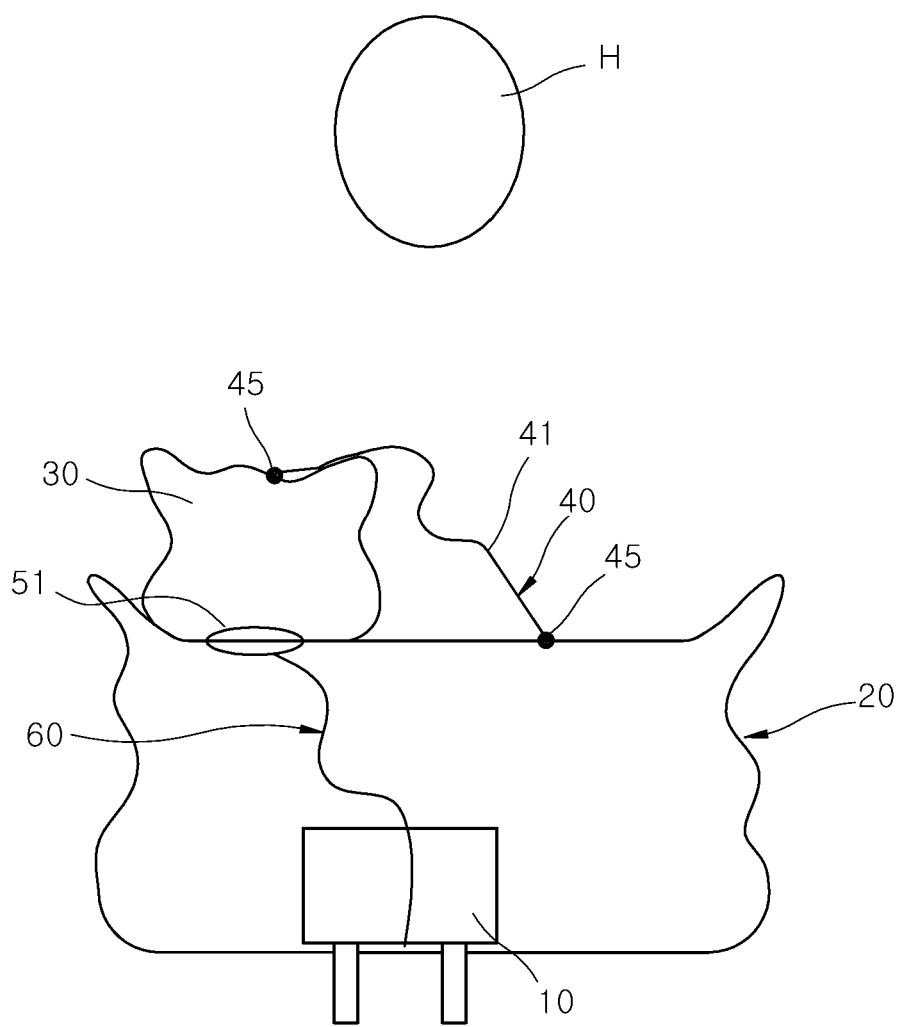
FIG. 23 illustrates that the first and second chambers are being expanded in the airbag apparatus in accordance with the first exemplary embodiment of the present invention.
Figure 24:
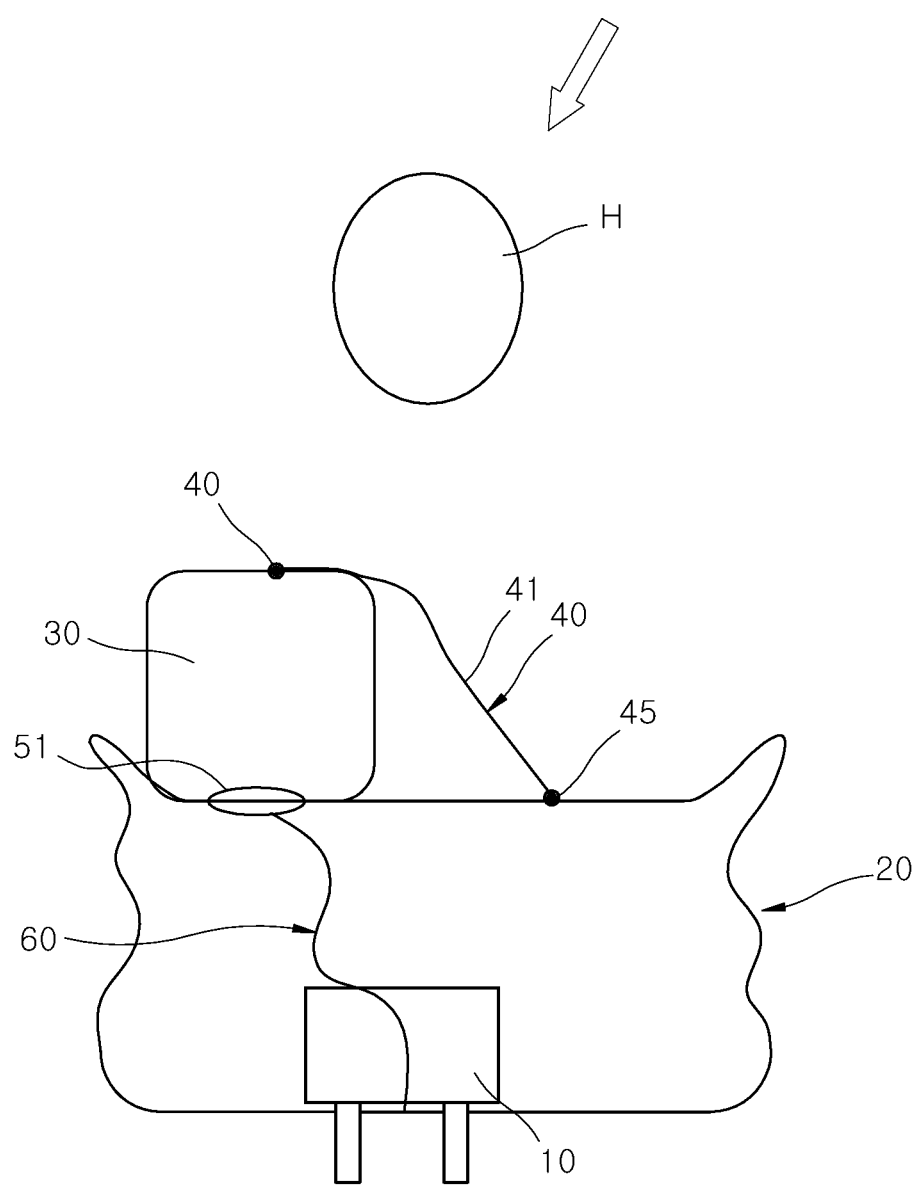
FIG. 24 illustrates that the second chamber is completely deployed in the airbag apparatus in accordance with the first exemplary embodiment of the present invention.
Figure 25:
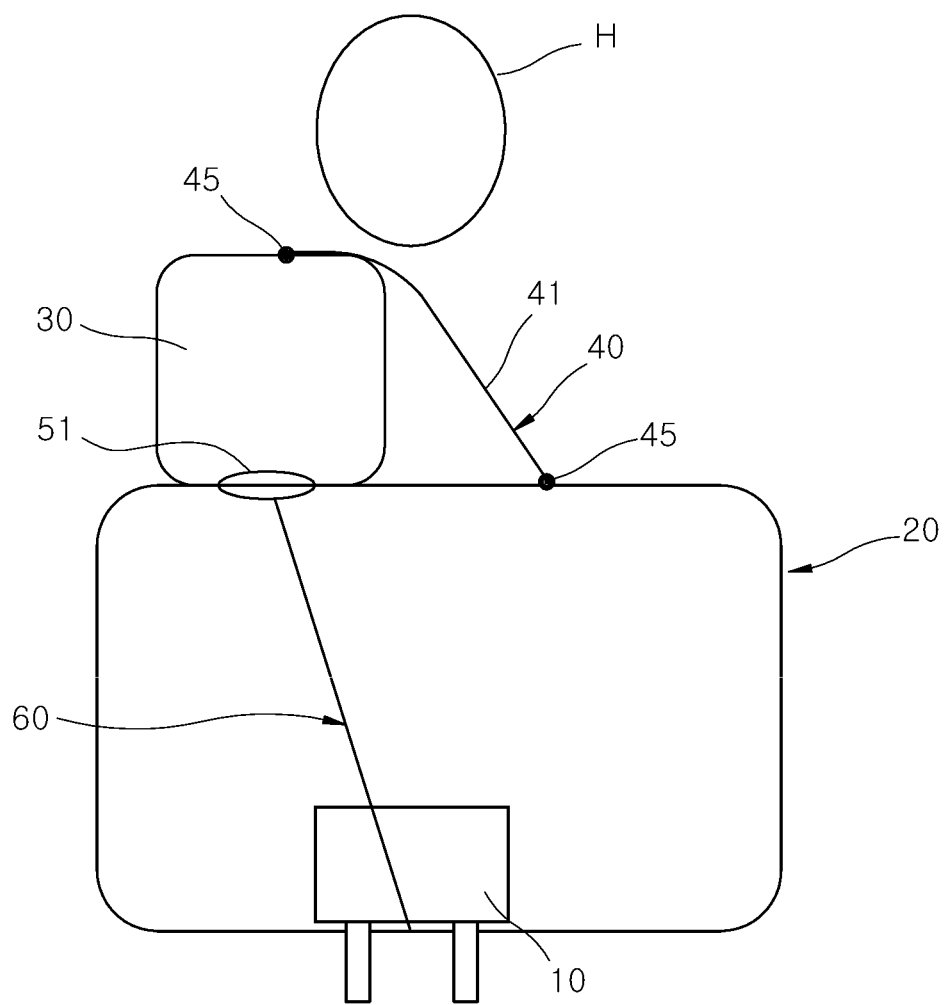
FIG. 25 illustrates that the first and second chambers are completely deployed in the airbag apparatus in accordance with the first exemplary embodiment of the present invention.
Figure 26:
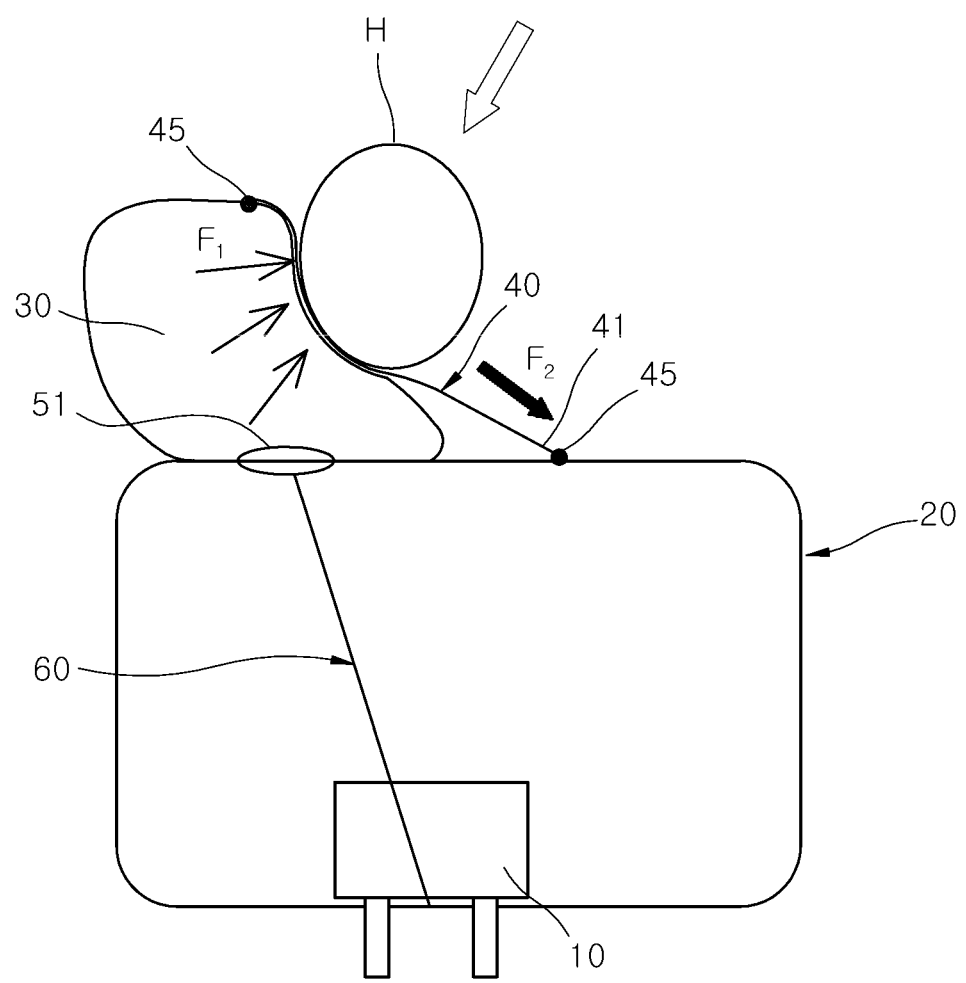
FIG. 26 illustrates that the head of a passenger collides with the second chamber in the airbag apparatus in accordance with the first exemplary embodiment of the present invention.

FIG. 22 illustrates that the temporary attachment part of the second chamber in the airbag apparatus in accordance with the first embodiment of the present invention is torn in case of an oblique collision of the vehicle, FIG. 23 illustrates that the first and second chambers are being expanded in the airbag apparatus in accordance with the first embodiment of the present invention, FIG. 24 illustrates that the second chamber is completely deployed in the airbag apparatus in accordance with the first embodiment of the present invention, FIG. 25 illustrates that the first and second chambers are completely deployed in the airbag apparatus in accordance with the first embodiment of the present invention, and FIG. 26 illustrates that a head collides with the second chamber in the airbag apparatus in accordance with the first embodiment of the present invention.

Referring to FIGS. 16 to 26, gas generated through the inflator 10 may be injected to the first chamber 20 in case of an oblique collision of the vehicle. The first chamber 20 may be deployed while expanded toward the rear of the vehicle. That is, the upper portion of the first chamber 20 may be first expanded and deployed, and the lower portion of the first chamber 20 may be then gradually deployed. The gas of the first chamber 20 may be introduced into the second chamber 30 through the communication tube 51. The expansion of the second chamber 30 may tear the temporary attachment part 33 of the folded part 31 (refer to FIG. 22).

At this time, while the first chamber 20 is deployed, the rear side of the first chamber 20 and the communication tube 51 may be moved toward the rear of the vehicle (refer to FIG. 23). Before the first chamber 20 is completely deployed, the valve tether 60 may not be tightly pulled.

The second chamber 30 may be completely deployed before the first chamber 20 (refer to FIG. 24). When the deployment of the first chamber 20 is almost completed, the communication tube 51 may be away from the rear of the first chamber 20. Thus, the valve tether 60 may be tightly extended toward the rear of the vehicle (refer to FIGS. 9 and 25). At this time, the tether ring 61 may close the communication tube 51 by tightening the communication tube 51. In an airbag apparatus in accordance with a second embodiment, since a plurality of valve tethers 60 may be drawn from a cross hole 166 of a cross connector 165, the communication tube 51 may be closed while tightened to the inside (refer to FIGS. 29 and 30). Therefore, since the gas of the second chamber 30 can be prevented from being discharged to the first chamber 20, a reduction in expensive force or support force of the second chamber 30 can be prevented.

In case of an oblique collision of the vehicle, the head H may be moved forward in a diagonal direction (refer to FIG. 26). As the head H is moved in the diagonal direction, the head H may pressurize the second chamber 30. Therefore, the second chamber 30 can be pressed against the head H and prevent a turn of the head H, which makes it possible to reduce the time required for holding the head H.

Since a turn of the head H is prevented in case of the oblique collision of the vehicle, an injury of the head H or the neck can be prevented. Furthermore, when the head H is obliquely moved toward the inboard side of the vehicle, the connection tether 40 may pull the second chamber 30 toward the first chamber 20 (outboard side) using the support force of the second chamber 30. Therefore, the head H can be prevented from being away from the second chamber 30.

In case of the oblique collision of the vehicle, the load of the head H may be first absorbed by the tensile force $F_2$ of the connection tether 40, and then absorbed by the buffering force $F_1$ of the second chamber 30. At this time, the connection tether 40 may primarily absorb the load of the head H through the pulling force of the first chamber 20, and the second chamber 30 may secondarily absorb the shock of the head H while deformed by the load of the head H. The load of the head H, transferred to the second chamber 30, may be transferred to the first chamber 20 and thus tertiarily absorbed.

Next, the operation of the airbag apparatus in case of a head-on collision of the vehicle will be described.

Figure 27:
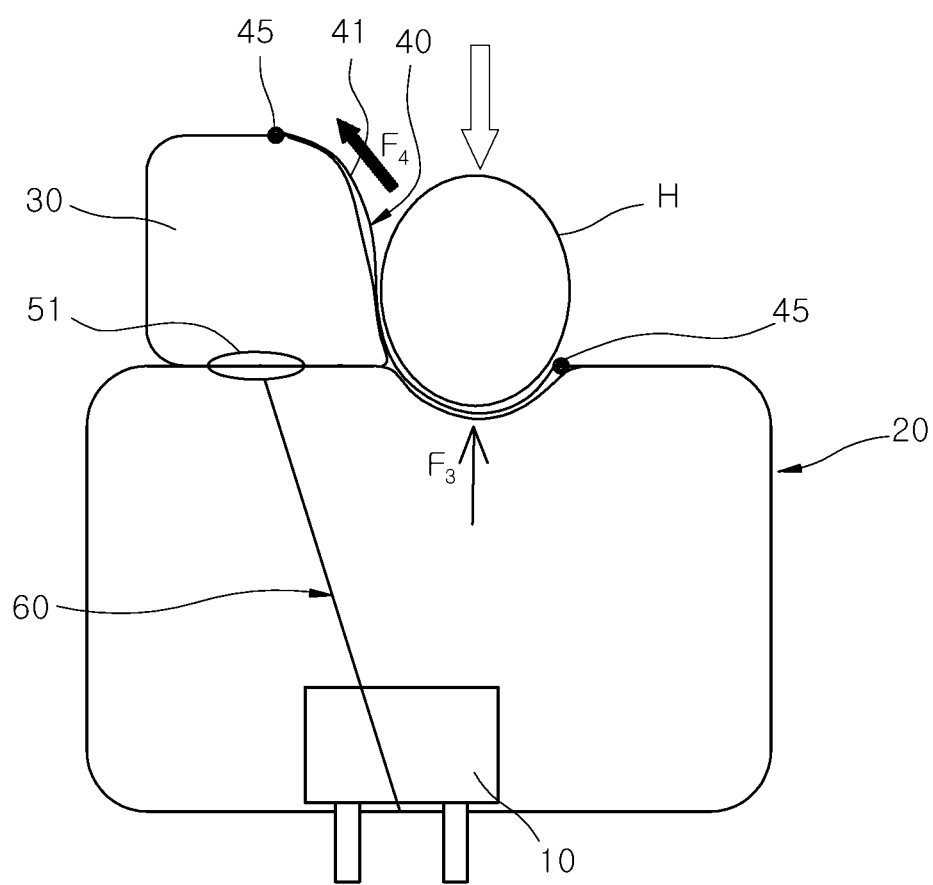
FIG. 27 is a plan view illustrating that the head collides with the first chamber in the airbag apparatus in accordance with the first exemplary embodiment of the present invention, in case of a head-on collision of the vehicle.

FIG. 27 is a plan view illustrating that the head collides with the first chamber in the airbag apparatus in accordance with the first embodiment of the present invention, in case of a head-on collision of the vehicle.

Referring to FIG. 27, the first chamber 20 may be disposed in front of the head H. Thus, in case of a head-on collision of the vehicle, the head H may be moved toward the first chamber 20. At this time, the second chamber 30 may be eccentrically disposed at the inboard side of the first chamber 20 so as to avoid a collision with the head H of the passenger in case of the head-on collision of the vehicle. Therefore, although the second chamber 30 is expanded and deployed toward the rear in case of a head-on collision of the vehicle, the head H can be prevented from being pushed rearward by the second chamber, which makes it possible to prevent the head from being injured or bent rearward by the second chamber 30.

As the first chamber 20 is deformed by the load of the head H, both ends of the connection tether 40 may be pulled by the second chamber 30. Therefore, the load of the head H may be primarily absorbed by the tensile force $F_4$ of the connection tether 40, and secondarily absorbed by the buffering force $F_3$ of the first chamber 20.

Figure 28:
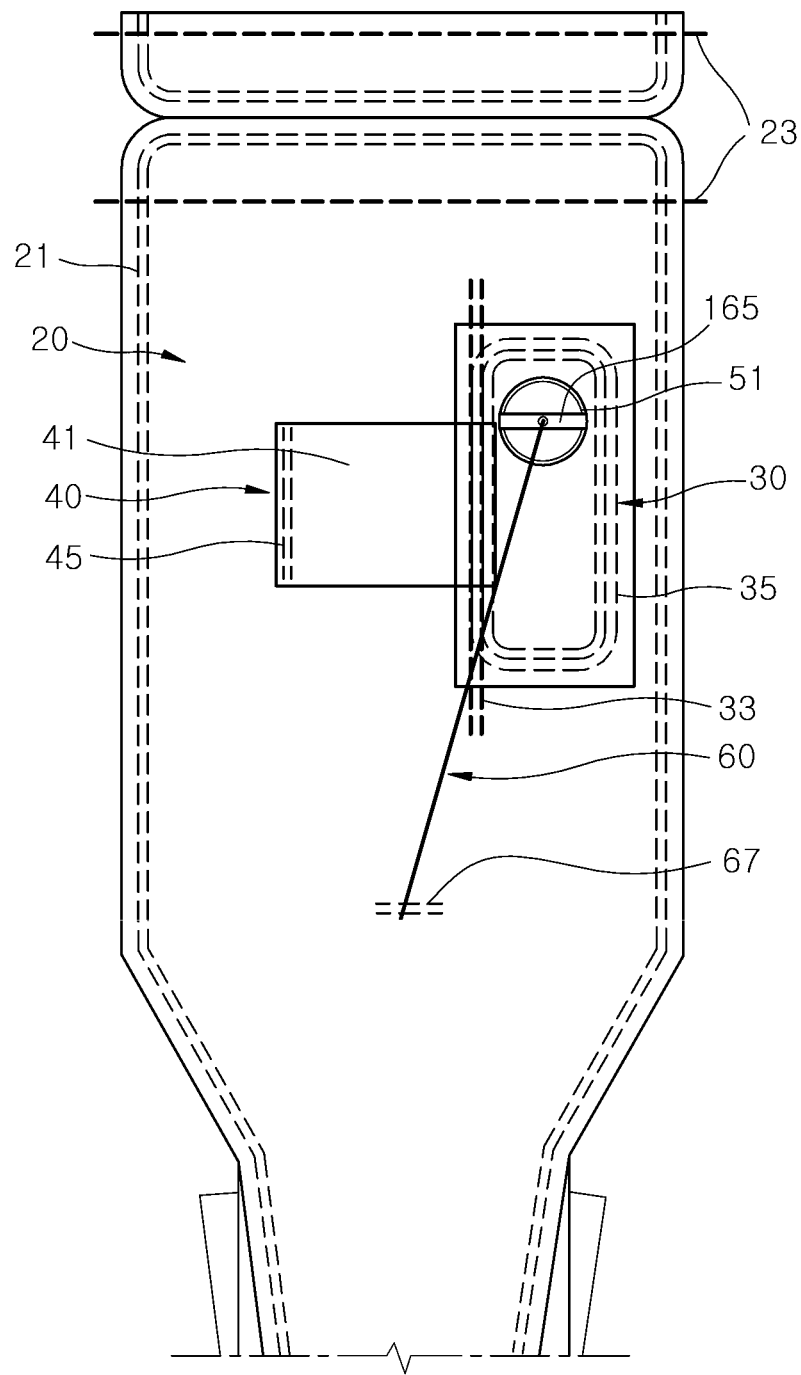
FIG. 28 illustrates that an airbag apparatus in accordance with a second exemplary embodiment of the present invention is unfolded.

FIG. 28 illustrates that an airbag apparatus in accordance with a second embodiment of the present invention is unfolded.

Referring to FIGS. 1, 2, 4, 5 and 28, the airbag apparatus in accordance with the second embodiment of the present invention may include a first chamber 20, a second chamber 30, a communication tube 51, a cross connector 165 and a plurality of valve tethers 60. Among the components of the airbag apparatus in accordance with the second embodiment, the same components as those of the airbag apparatus in accordance with the first embodiment will be represented by like reference numerals, and the detailed descriptions thereof are omitted herein.

The first chamber 20 may be connected to the inflator 10, and support a head H in case of a head-on collision of a vehicle. When the first chamber 20 is completely deployed, the first chamber 20 may have a rectangular box shape. The first chamber 20 may be supported by an instrument panel (not illustrated) at the inner front of the vehicle.

The second chamber 30 may be connected to the first chamber 20 by a second sewed part 35. The second sewed part 35 may be formed in a rectangular frame shape along the edge of the second chamber 30.

The second chamber 30 may be connected to the rear of the first chamber 20 so as to be supported by the first chamber 20, and suppress the head H of a passenger from moving in a diagonal direction in case of an oblique collision of the vehicle. That is, the second chamber 30 may support one side of the head H while blocking the one side of the head H, in case of an oblique collision of the vehicle. Therefore, the head H of the passenger can be prevented from being pushed and turned to one side of the second chamber 30, which makes it possible to shorten the time required for holding the head H. Since the turn of the head H is prevented in case of an oblique collision of the vehicle, an injury of the head H or the neck can be prevented. Furthermore, although the size of the first chamber 20 is not increased or the increase of the size is minimized, it is possible to protect the head H of the passenger.

The second chamber 30 may be eccentrically disposed at the inboard side of the first chamber 20, in order to avoid a collision with the head H of the passenger in case of a head-on collision of the vehicle. The inboard side may indicate the widthwise center of the vehicle. The width of the second chamber 30 or the length of the second chamber 30 in the widthwise direction of the vehicle may be set to less than a half of the width of the first chamber 20. Thus, although the second chamber 30 is expanded and deployed toward the rear in case of a head-on collision of the vehicle, the head H can be prevented from being pushed rearward by the second chamber, which makes it possible to prevent the head from being injured or bent rearward by the second chamber 30.

The edge of the first chamber 20 may be sewed through a first sewed part 21. The top of the first chamber 20 may be sewed through a reinforcement sewed part 23. Since the top of the first chamber 20 is sewed through the reinforcement sewed part 23, the top of the first chamber 20 can be prevented from an external shock.

The second chamber 30 may be double-folded in such a manner that one side thereof is introduced to the inside, and an end portion of the folded part 31 may be temporarily attached to the first chamber 20. The folded part 31 of the second chamber 30 may be formed by folding the second chamber 30 once or a plurality of times. The folded part 31 of the second chamber 30 may face the inboard side of the vehicle. Since the second chamber 30 is double-folded in such a manner that one side thereof is introduced to the inside, the length of the second chamber 30 can be increased more than when the second chamber 30 is installed without a folded part. Since the expansion height of the second chamber 30 can be sufficiently increased when the second chamber 30 is expanded and deployed, the head H of the passenger can be rapidly held. Therefore, in case of an oblique collision of the vehicle, the head H of the passenger can be held by the second chamber 30, and thus prevented from turning or moving in a diagonal direction.

Since the folded part 31 of the second chamber 30 is temporarily attached to the first chamber 20, the temporary attachment part 33 may be torn when the second chamber 30 is expanded and deployed.

When the first chamber 20 is sewed, the folded part 31 of the second chamber 30 may be temporarily attached to the first chamber 20. Therefore, since the second chamber 30 can be temporarily attached to the first chamber 20 through one sewing process, it is possible to reduce the manufacturing time and cost of the airbag apparatus.

The airbag apparatus may further include a connection tether 40 which connects the first and second chambers 20 and 30 so as to restrict the second chamber 30 from leaning to the inboard side, when the second chamber 30 is deployed. At this time, one end of the connection tether 40 may be connected to a position separated from the second chamber 30 in the first chamber 20 or connected to the second sewed part 35 of the second chamber 30. The connection tether 40 may apply a tensile force to the second chamber 30 to pull the second chamber 30 toward the first chamber 20, when the first and second chambers 20 and 30 are expanded.

In case of an oblique collision of the vehicle, the connection tether 40 and the second chamber 30 may be deformed in a stepwise manner while absorbing the load of the head H. That is, the head H may be primarily held by the connection tether 40, and then secondarily held by the second chamber 30. Therefore, since the time required for holding the head H is shortened in case of an oblique collision of the vehicle, an injury of the head H or the neck can be prevented.

When the head H is moved obliquely in a diagonal direction of the vehicle in case of an oblique collision of the vehicle, the connection tether 40 can pull the second chamber 30 toward the first chamber 20 using a support force (reaction force) of the first chamber 20, thereby preventing the head H from separating from the second chamber 30. Therefore, the sizes of the first and second chambers 20 and 30 may not be increased to protect the head H.

When the head H applies a load to the connection tether 40 and the first chamber 20 in case of a head-on collision of the vehicle, the connection tether 40 and the first chamber 20 may absorb the load of the head H in a stepwise manner. At this time, when the first chamber 20 is contracted forward by the load of the head H, the load of the head H can be buffered by the tensile force of the connection tether 40 and the reaction force of the second chamber 30 because the reaction force of the second chamber 30 pulls the connection tether 40.

The connection tether 40 may be disposed at the rears of the first and second chambers 20 and 30 such that the head H comes in contact with the connection tether 40. Therefore, when the head H collides with the first or second chamber 20 or 30, the connection tether 40 can primarily buffer the load of the head H.

The connection tether 40 may include a surface tether 41 which partially covers the rear surface of the first chamber 20 and the rear surface of the second chamber 30 (refer to FIG. 2). The rear surface of the first chamber 20 and the rear surface of the second chamber 30 may come in direct contact with the head H. Both sides of the surface tether 41 may be connected to the first and second chambers 20 and 30 by connection sewed parts 45. The surface tether 41 may indicate a rectangular or elliptical tether of which the width is smaller than the length. When the connection tether 40 is the surface tether 41, the surface tether 41 may uniformly come in contact with a colliding part of the head H, which makes it possible to prevent concentration of pressure on a specific part of the head H. Therefore, the head H can be prevented from being injured by the connection tether 40.

The connection tether 40 may include a plurality of line tethers 42 which connect the first and second chambers 20 and 30 (refer to FIG. 5). Alternatively, the connection tether 40 may include one line tether 42 which connects the first and second chambers 20 and 30. Both sides of the line tether 42 may be connected to the first and second chambers 20 and 30 by the connection sewed parts 45. The line tether 42 may indicate a string-type or band-type tether formed in an elongated shape. The number of line tethers 42 may be appropriately designed depending on the heights of the first and second chambers 20 and 30 or the size of the vehicle.

Figure 29:
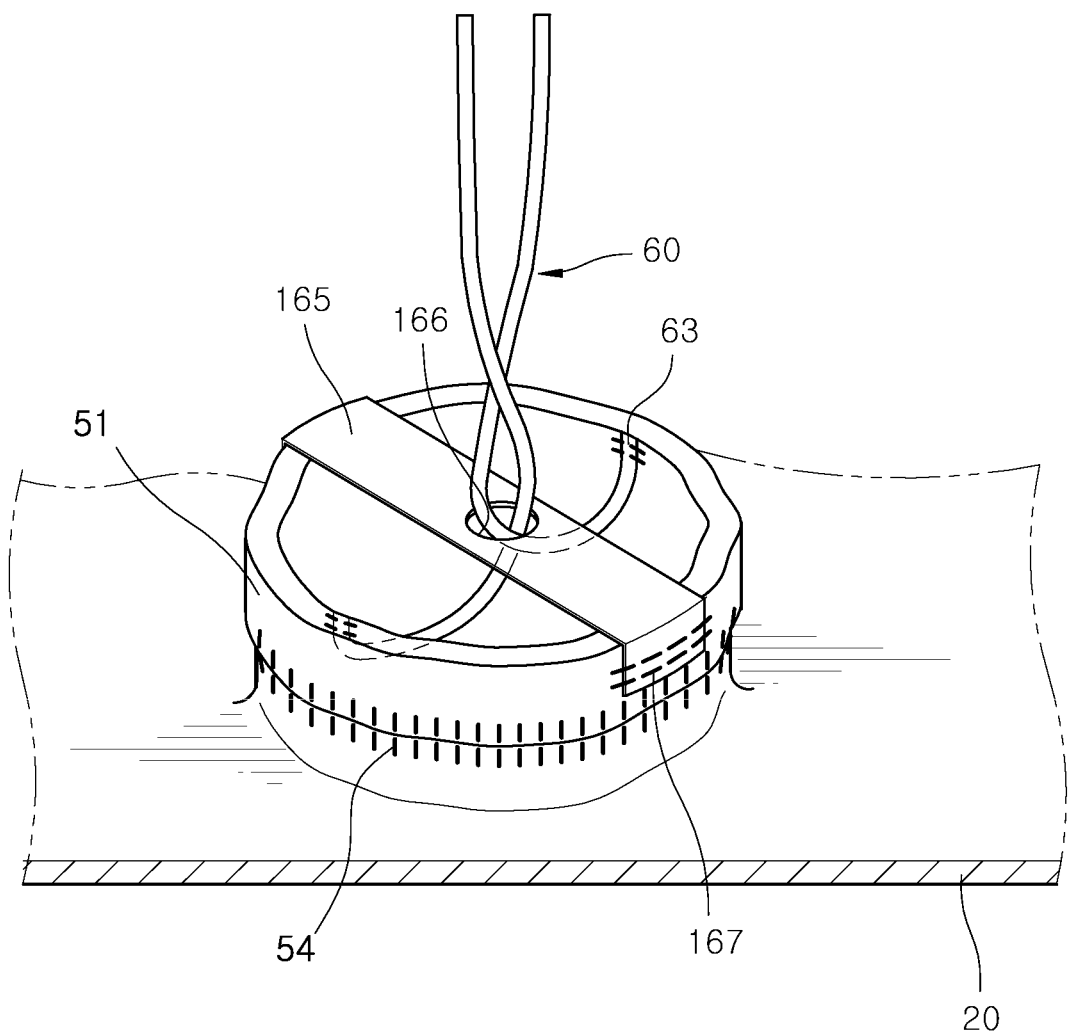
FIG. 29 is a perspective view illustrating a communication tube and valve tethers in the airbag apparatus in accordance with the second exemplary embodiment of the present invention.
Figure 30:
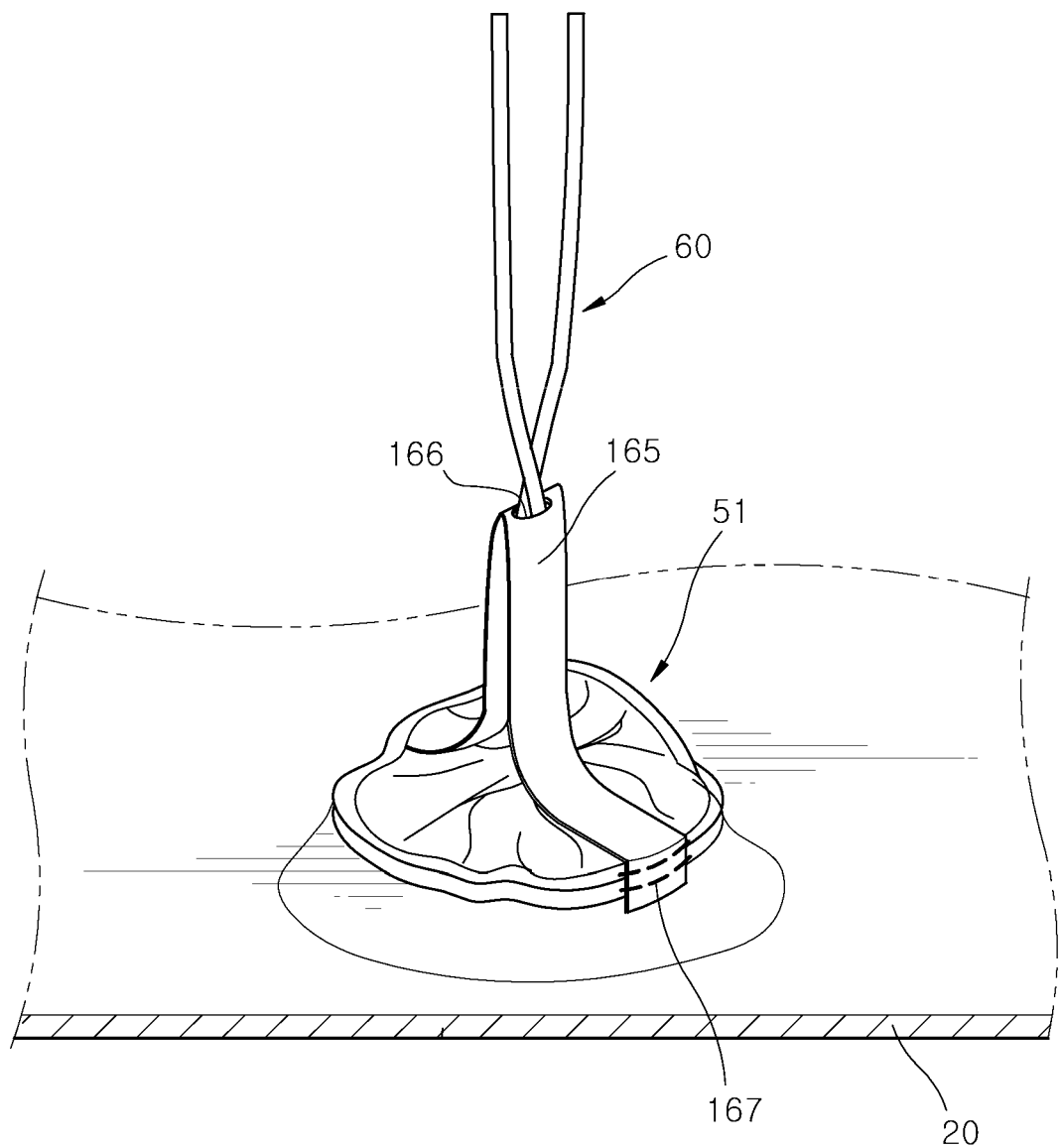
FIG. 30 is a perspective view illustrating that the communication tube is closed by the valve tethers in the airbag apparatus in accordance with the second exemplary embodiment of the present invention.

FIG. 29 is a perspective view illustrating the communication tube and the valve tethers in the airbag apparatus in accordance with the second embodiment of the present invention, and FIG. 30 is a perspective view illustrating that the communication tube is closed by the valve tethers in the airbag apparatus in accordance with the second embodiment of the present invention.

Referring to FIGS. 29 and 30, the communication tube 51 may be formed of the same material as the first chamber 20. Alternatively, the communication tube 51 may be formed of a different material from the first chamber 20, and then sewed to the first chamber 20.

The communication tube 51 may be formed in the first chamber 20 so as to introduce gas of the first chamber 20 to the second chamber 30. The communication tube 51 may be formed in a cylindrical shape or polygonal cylinder shape. As the communication tube 51 is formed in a cylindrical shape, the pressure of the gas may be uniformly applied in the circumferential direction of the communication tube 51.

The cross connector 165 may be installed across the communication tube 51, and have both sides connected to the communication tube 51. At this time, the cross connector 165 may be disposed along the diameter direction of the communication tube 51. The cross connector 165 may be formed in an elongated band shape. The cross connector 165 may be formed of the same material as or a different material from the valve tether 60.

The cross connector 165 may have a cross hole 166 through which the plurality of valve tethers 60 are installed. At this time, the cross hole 166 may be formed in the longitudinal center of the cross connector 165. As the plurality of valve tethers 60 are drawn through the cross hole 166, the communication tube 51 may be contracted toward the cross hole 166. As the communication tube 51 is contracted toward the cross hole 166, the communication tube 51 may be closed.

Both sides of the cross connector 165 may be fixed to the communication tube 51 by sewed parts 167. Therefore, although the drawing pressure of the valve tethers 60 is applied to the cross connector 165, the cross connector 165 can be prevented from separating from the communication tube 51.

The plurality of valve tethers 60 may be connected to the communication tube 51 through the cross connector 165. Furthermore, the plurality of valve tethers 60 may be connected to the first chamber 20 so as to close the communication tube 51 by pulling the communication tube 51 to the inside when the first chamber 20 is deployed. Since the plurality of valve tethers 60 closes the communication tube 51 by pulling the communication tube 51 to the inside when the first chamber 20 is deployed, the end portion of the communication tube 51 may be contracted toward the center thereof, and thus close the passage of the gas. Therefore, a reduction in expansion force or supporting force of the second chamber 30 can be prevented.

One ends of the valve tethers 60 may be connected to the end portion of the communication tube 51, and the other ends of the valve tethers 60 may be connected to the first chamber 20. At this time, the one end portions of the valve tethers 60 may be fixed to the communication tube 51 by the fixing sewed parts 63, and the other end portions of the valve tethers 60 may be fixed to the first chamber 120 by the valve sewed parts 67 (refer to FIG. 28).

One pair of valve tethers 60 may be installed at both sides of the communication tube 51, and one ends of the pair of valve tethers 60 may be disposed in the communication tube 51 so as to face each other. Therefore, when the first chamber 20 is deployed, the pair of valve tethers 60 may pull the end portion of the communication tube 51 to the inside (center), thereby closing the gas passage.

Since the valve tethers 60 close the communication tube 51 by pulling the communication tube 51 to the inside when the first chamber 20 is deployed, gas leakage of the second chamber 30 can be prevented. Therefore, since a reduction in expensive force (support force) of the second chamber 30 can be prevented, the support force of the second chamber 30 can be increased in case of a collision with the head H, while the head H is suppressed from moving in a diagonal direction.

Since the operation of the airbag apparatus in accordance with the second embodiment of the present invention is performed in the same manner as the operation of the airbag apparatus in accordance with the first embodiment of the present invention, the detailed descriptions thereof are omitted herein.

Figure 31:
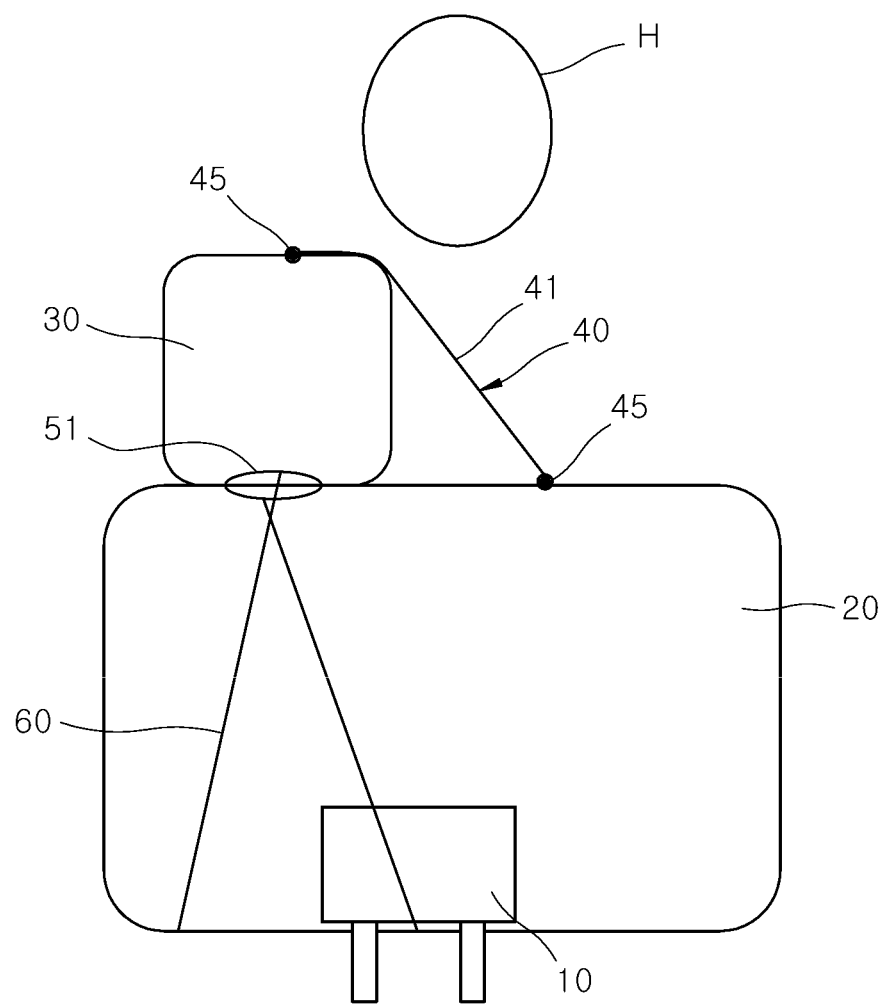
FIG. 31 is a plan view illustrating an airbag apparatus in accordance with a third exemplary embodiment of the present invention.
Figure 32:
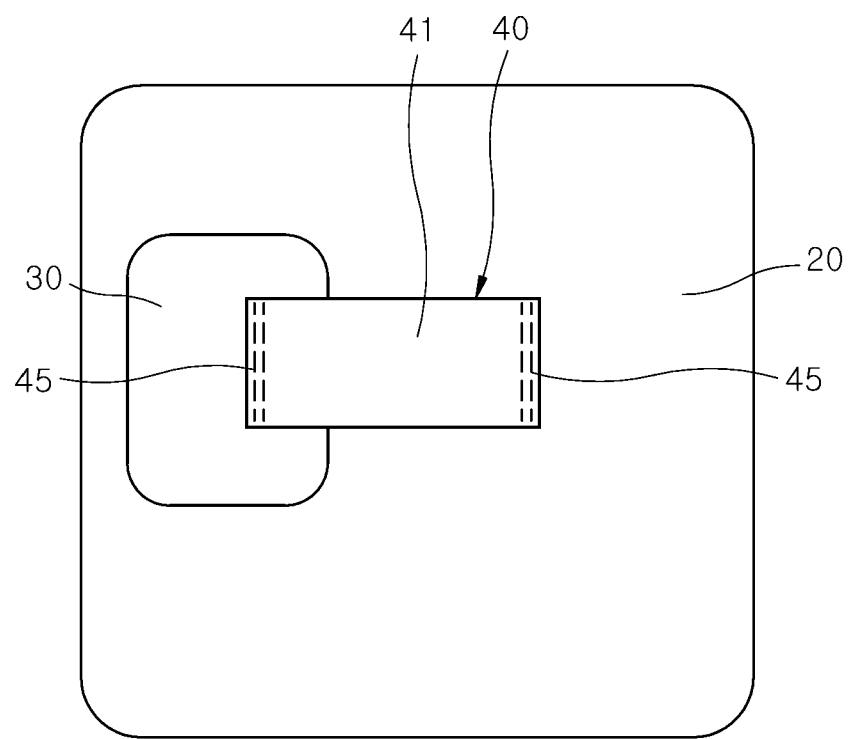
FIG. 32 is a front view illustrating the airbag apparatus in accordance with the third exemplary embodiment of the present invention.
Figure 33:
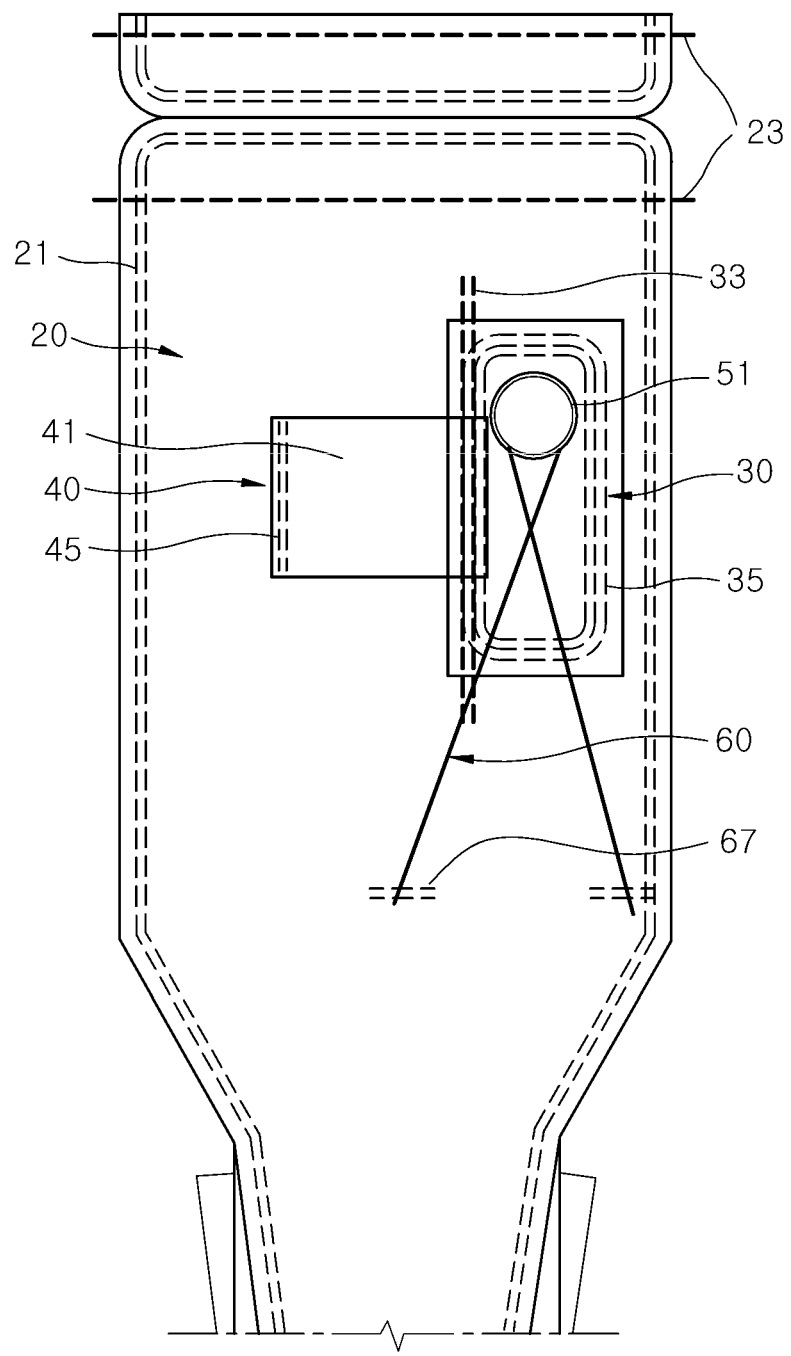
FIG. 33 illustrates that the airbag apparatus in accordance with the third exemplary embodiment of the present invention is folded.
Figure 34:
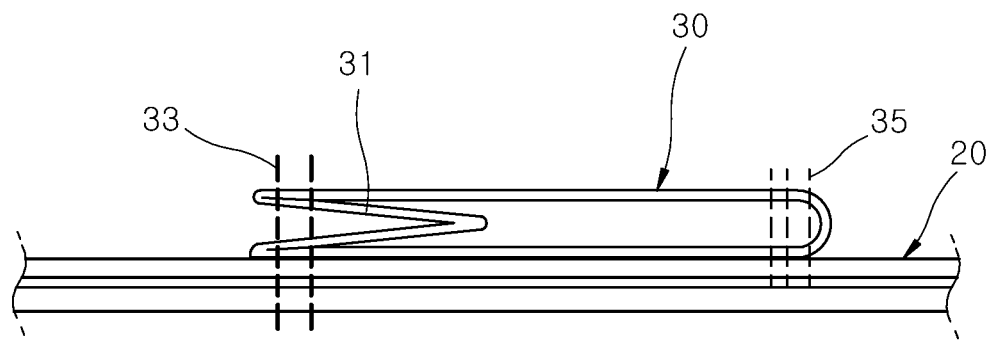
FIG. 34 is a cross-sectional view illustrating that a second chamber is folded and installed on a first chamber in the airbag apparatus in accordance with the third exemplary embodiment of the present invention.
Figure 35:
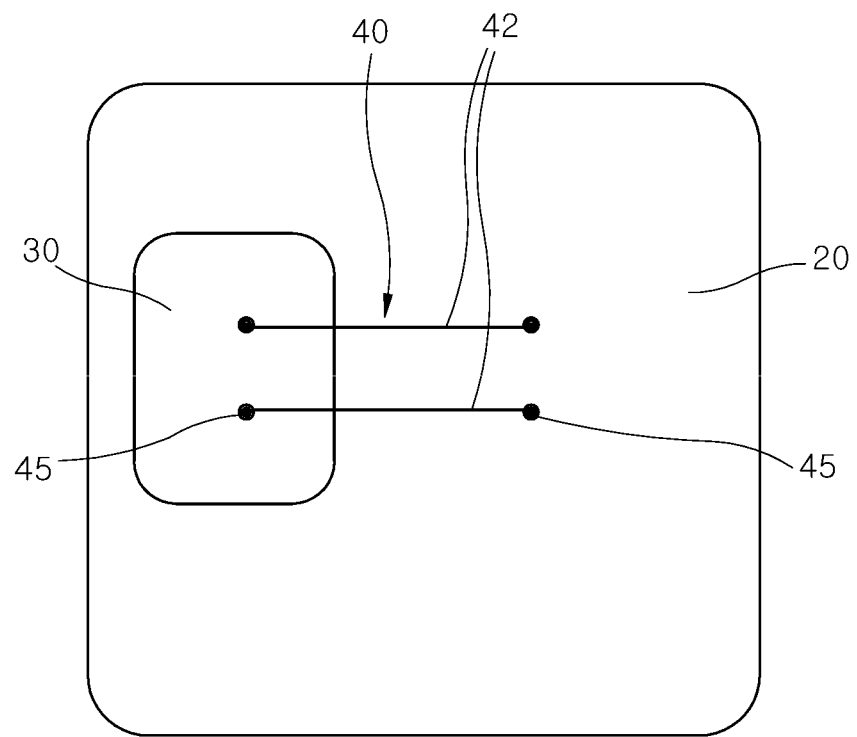
FIG. 35 is a front view illustrating another example of a connection tether in the airbag apparatus in accordance with the third exemplary embodiment of the present invention.
Figure 36:
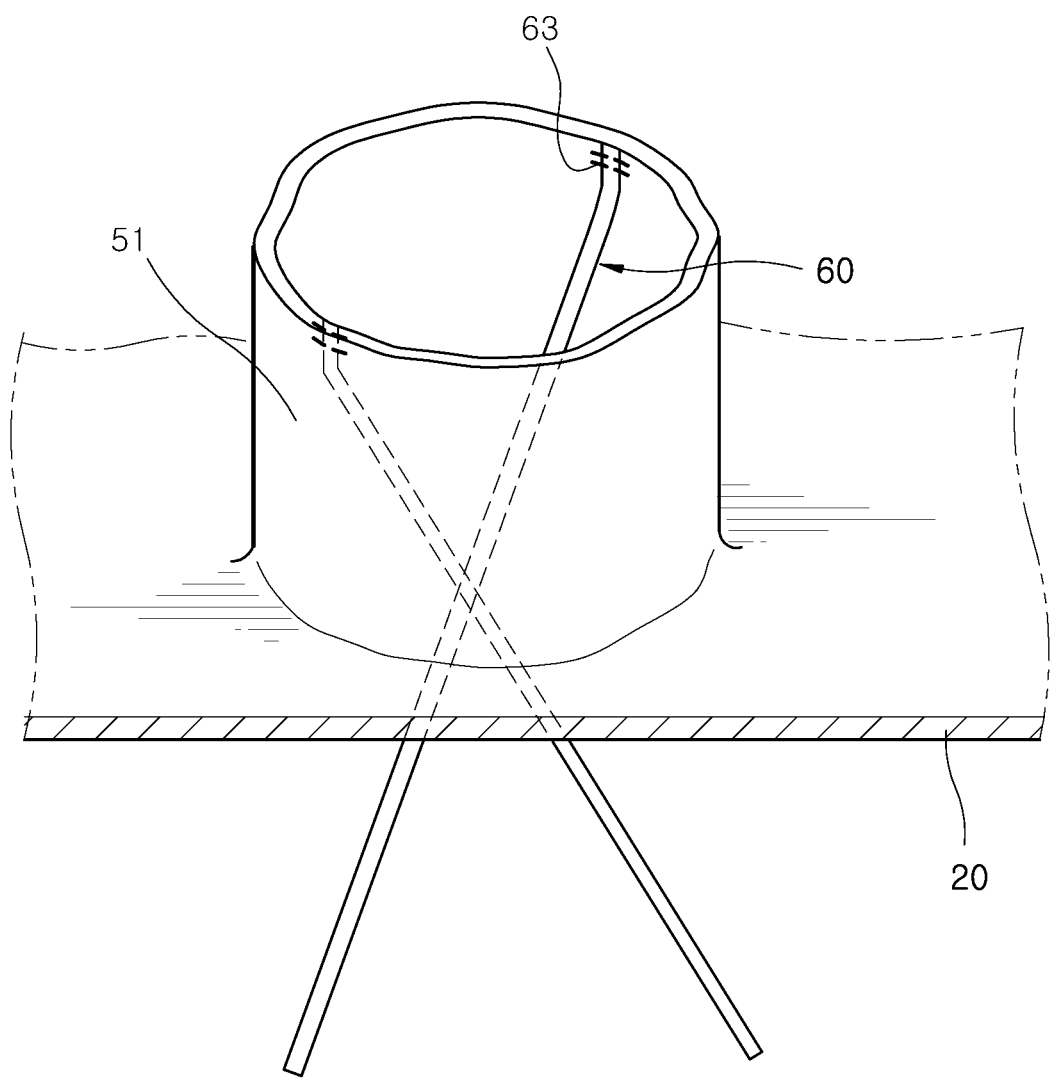
FIG. 36 is a perspective view illustrating a communication tube and valve tethers in the airbag apparatus in accordance with the third exemplary embodiment of the present invention.

FIG. 31 is a plan view illustrating an airbag apparatus in accordance with a third embodiment of the present invention, FIG. 32 is a front view illustrating the airbag apparatus in accordance with the third embodiment of the present invention, FIG. 33 illustrates that the airbag apparatus in accordance with the third embodiment of the present invention is folded, FIG. 34 is a cross-sectional view illustrating that a second chamber is folded and installed on a first chamber in the airbag apparatus in accordance with the third embodiment of the present invention, and FIG. 35 is a front view illustrating another example of a connection tether in the airbag apparatus in accordance with the third embodiment of the present invention. FIG. 36 is a perspective view illustrating a communication tube and valve tethers in the airbag apparatus in accordance with the third embodiment of the present invention, and FIG. 37 is a perspective view illustrating that the communication tube is closed by the valve tether in the airbag apparatus in accordance with the third embodiment of the present invention.

Referring to FIGS. 31 to 35, the airbag apparatus in accordance with the third embodiment of the present invention may include a first chamber 20, a second chamber 30, a communication tube 51 and a plurality of valve tethers 60. The airbag apparatus in accordance with the third embodiment may include almost the same components as the airbag apparatus in accordance with the first embodiment, except that the plurality of valve tethers 60 are installed. Therefore, the following descriptions will be focused on the different components from those of the first embodiment, and the detailed descriptions of the same components as those of the first embodiment are omitted herein.

Figure 37:
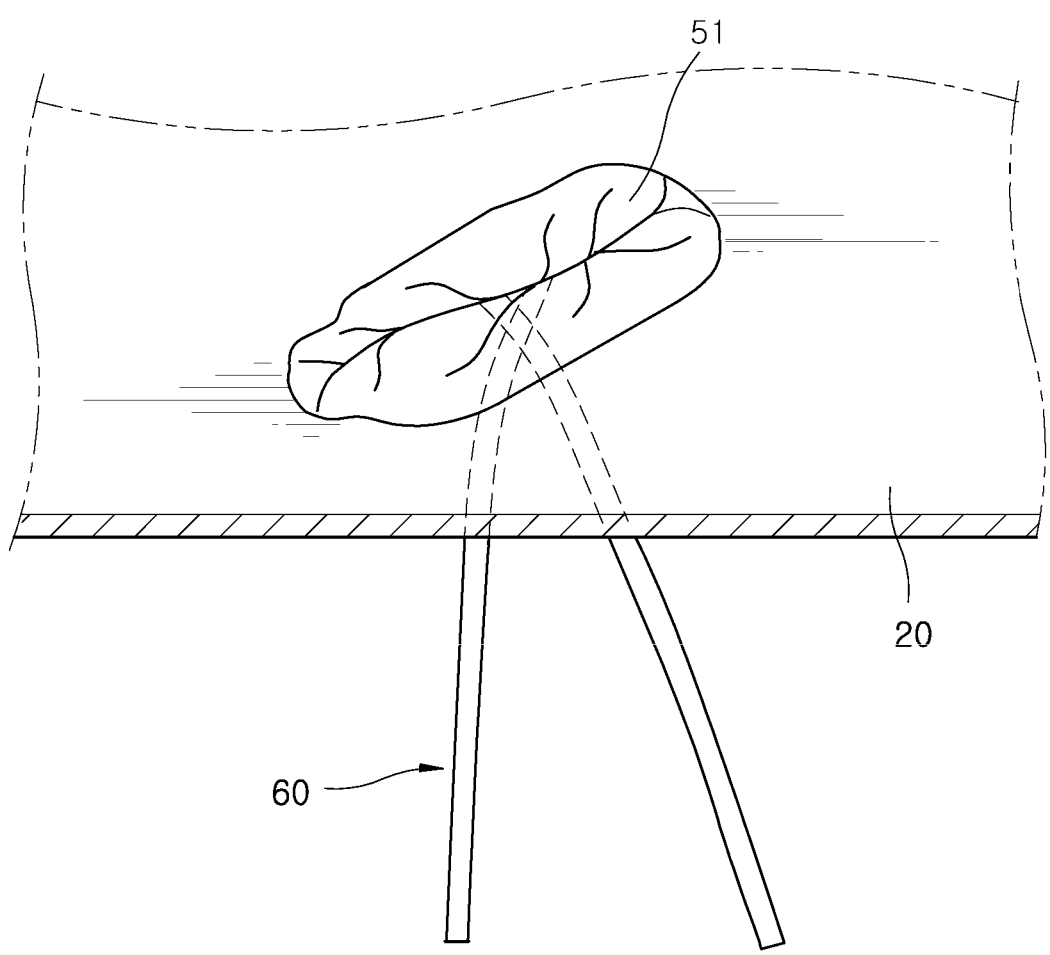
FIG. 37 is a perspective view illustrating that the communication tube is closed by the valve tether in the airbag apparatus in accordance with the third exemplary embodiment of the present invention.

Referring to FIGS. 36 and 37, the communication tube 51 may be formed of the same material as the first chamber 20. Alternatively, the communication tube 51 may be formed of a different material from the first chamber 20, and then sewed to the first chamber 20.

The communication tube 51 may be formed in the first chamber 20 so as to introduce gas of the first chamber 20 into the second chamber 30. The communication tube 51 may be formed in a cylindrical shape or polygonal cylindrical shape. Since the communication tube 51 is formed in a cylinder shape, the pressure of the gas can be uniformly applied in the circumferential direction of the communication tube 51.

The plurality of valve tethers 60 may be connected to the communication tube 51. Furthermore, the plurality of valve tethers 60 may be connected to the first chamber 20 so as to close the communication tube 51 by pulling communication tube 51 to the inside when the first chamber 20 is deployed. Since the plurality of valve tethers 60 may close the communication tube 51 by pulling the communication tube 51 to the inside when the first chamber 20 is deployed, the end portion of the communication tube 51 may be deformed in a line shape toward the center, thereby closing the passage of the gas. Therefore, a reduction in expansion force or supporting force of the second chamber 30 can be prevented.

One ends of the valve tethers 60 may be connected to the end portion of the communication tube 51, and the other ends of the valve tethers 60 may be connected to the first chamber 20. At this time, the one end portions of the valve tethers 60 may be fixed to the communication tube 51 by a fixing sewed part 63, and the other end portions of the valve tethers 60 may be fixed to the first chamber 120 by a valve sewed part 67 (refer to FIG. 33).

The plurality of valve tethers 60 may be disposed so as to cross each other. For example, a pair of valve tethers 60 may be installed at both sides of the communication tube 51, and one ends of the pair of valve tethers 60 may be disposed on the communication tube 51 so as to face each other. Therefore, when the first chamber 20 is deployed, the pair of valve tethers 60 can pull the end portion of the communication tube 51 toward the inside (center), thereby closing the gas passage.

The plurality of valve tethers 60 may be formed in a band shape. Since the valve tethers 60 are formed in a band shape, the flow resistance of the gas may hardly occur even though the valve tethers 60 are disposed across the inside of the communication tube 51.

Since the valve tethers 60 close the communication tube 51 by pulling the communication tube 51 to the inside when the first chamber 20 is deployed, gas leakage of the second chamber 30 can be prevented. Therefore, since a reduction in expensive force (support force) of the second chamber 30 can be prevented, the support force of the second chamber 30 can be increased in case of a collision of the head H, while the head H is suppressed from moving in a diagonal direction.

The operation of the airbag apparatus in accordance with the third embodiment of the present invention will be described. Hereafter, the operations of the airbag apparatus in case of an oblique collision and head-on collision of the vehicle will be sequentially described.

First, the operation of the airbag apparatus in case of an oblique collision of the vehicle will be described.

Figure 38:
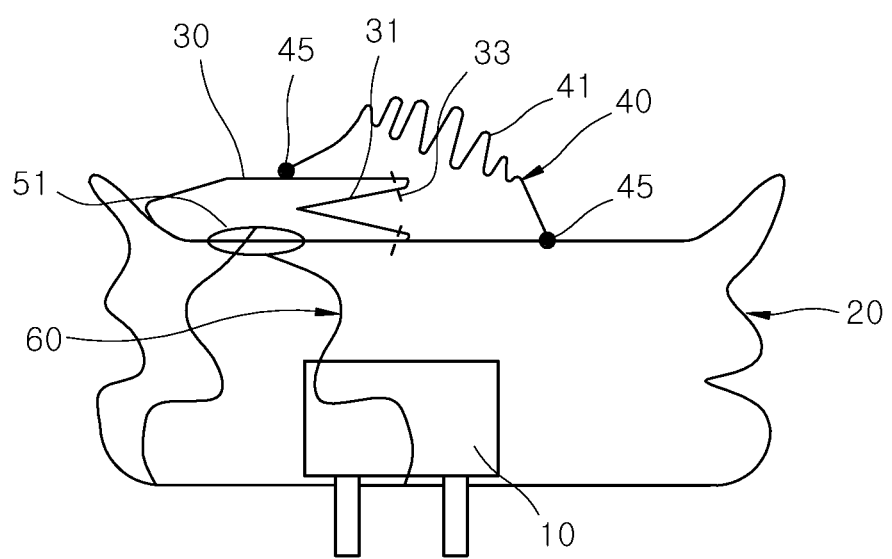
FIG. 38 illustrates that a temporary attachment part of the second chamber in the airbag apparatus in accordance with the third exemplary embodiment of the present invention is torn in case of an oblique collision of the vehicle.
Figure 39:
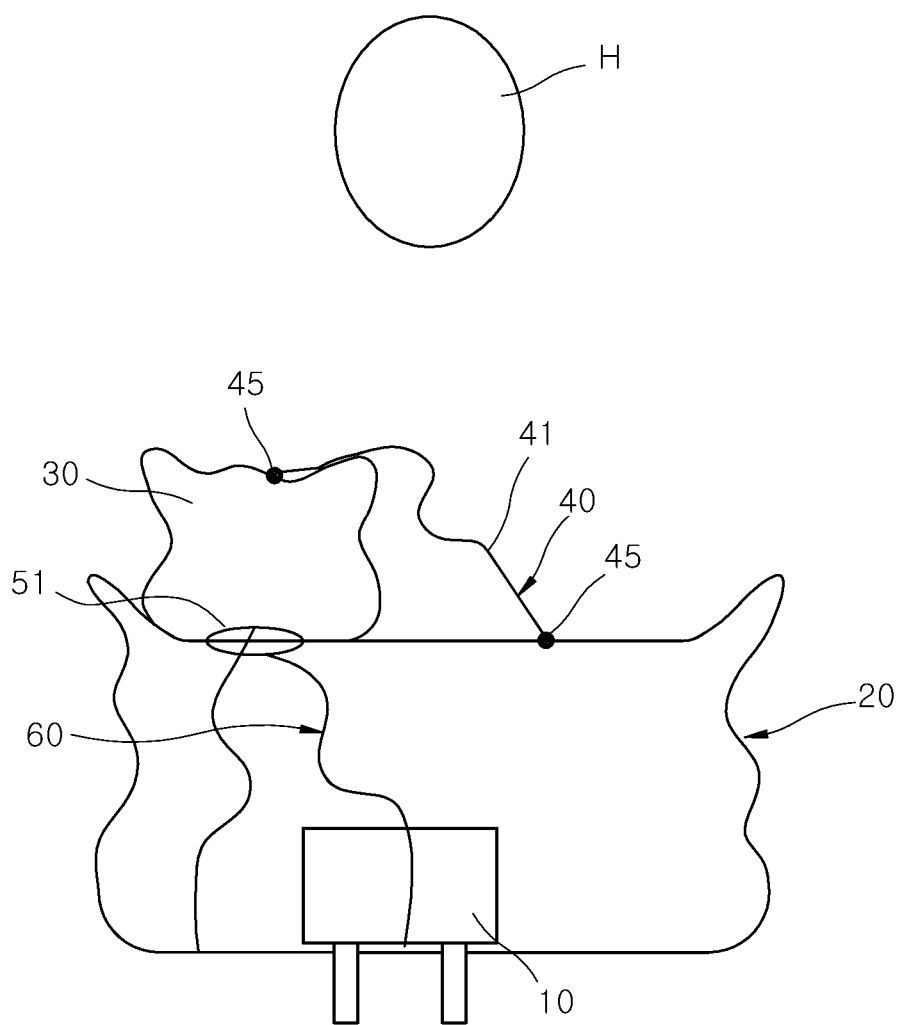
FIG. 39 illustrates that the first and second chambers are expanded in the airbag apparatus in accordance with the third exemplary embodiment of the present invention.
Figure 40:
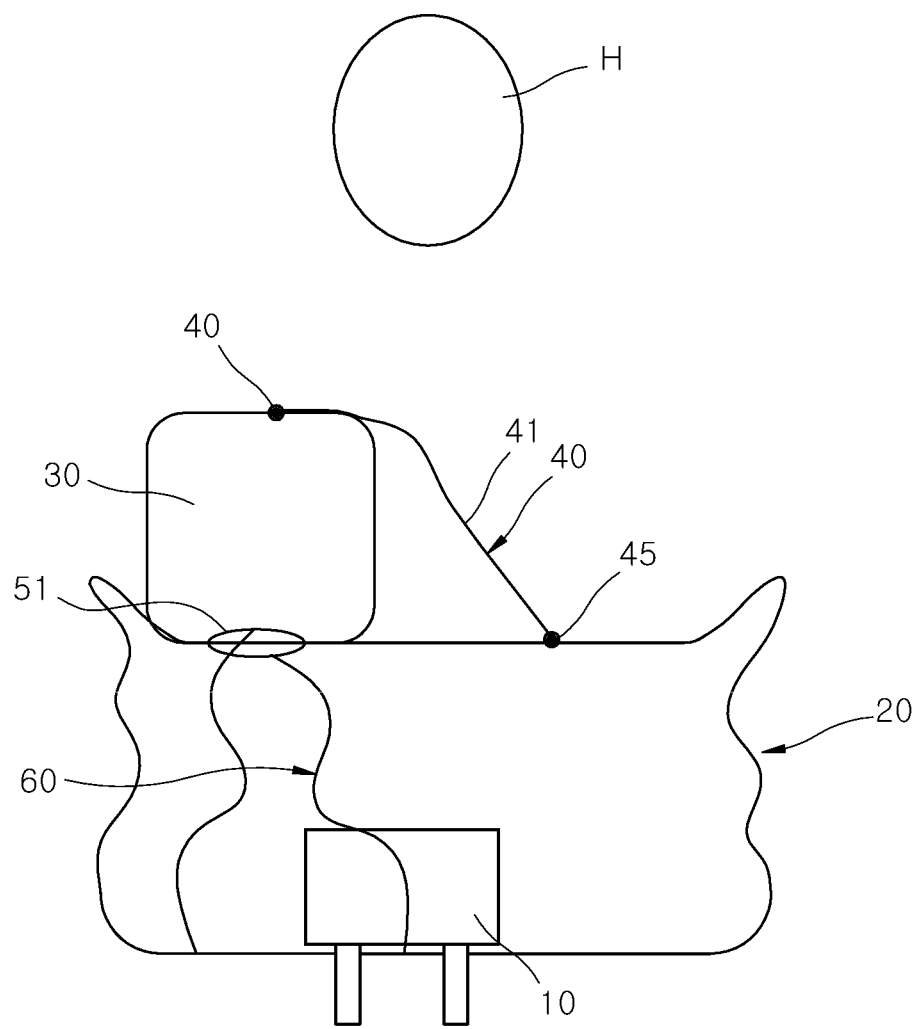
FIG. 40 illustrates that the second chamber is completely deployed in the airbag apparatus in accordance with the third exemplary embodiment of the present invention.
Figure 41:
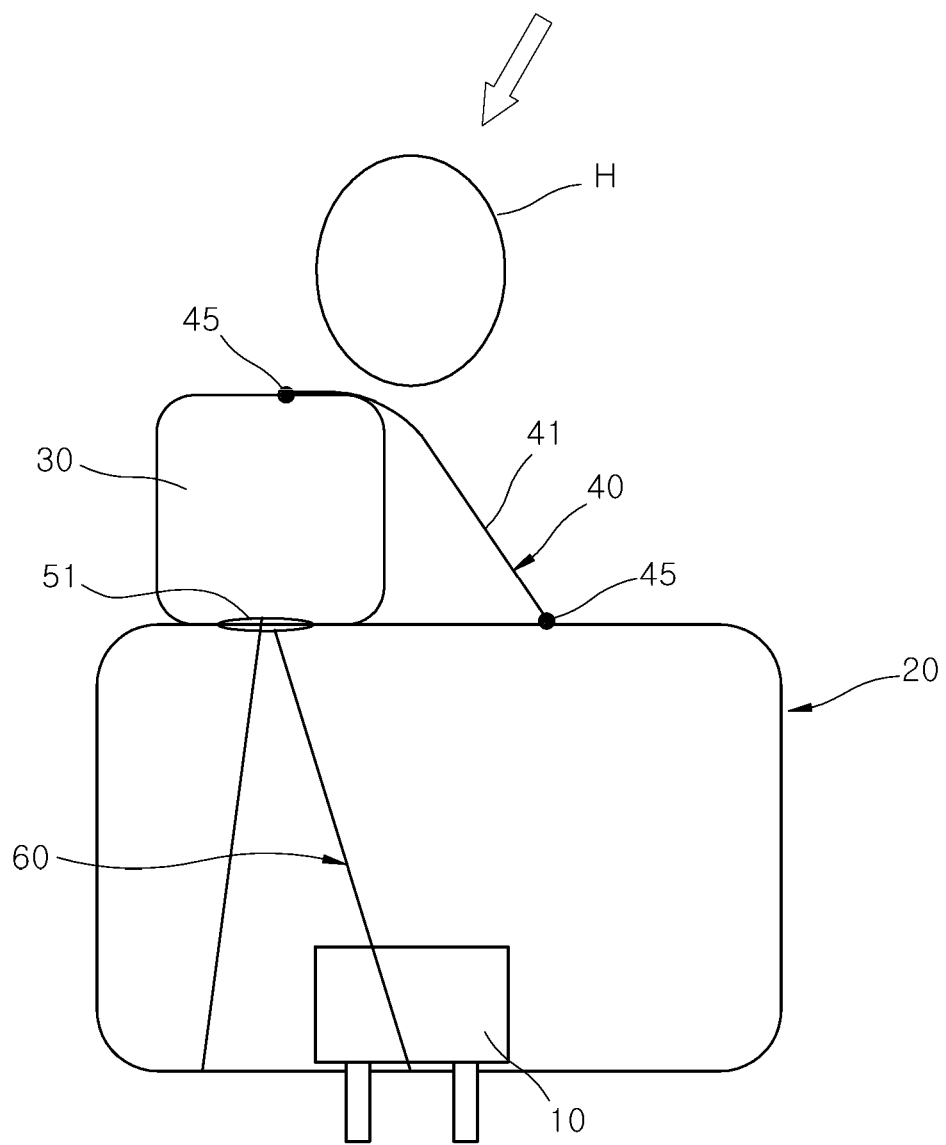
FIG. 41 illustrates that the first and second chambers are completely deployed in the airbag apparatus in accordance with the third exemplary embodiment of the present invention.
Figure 42:
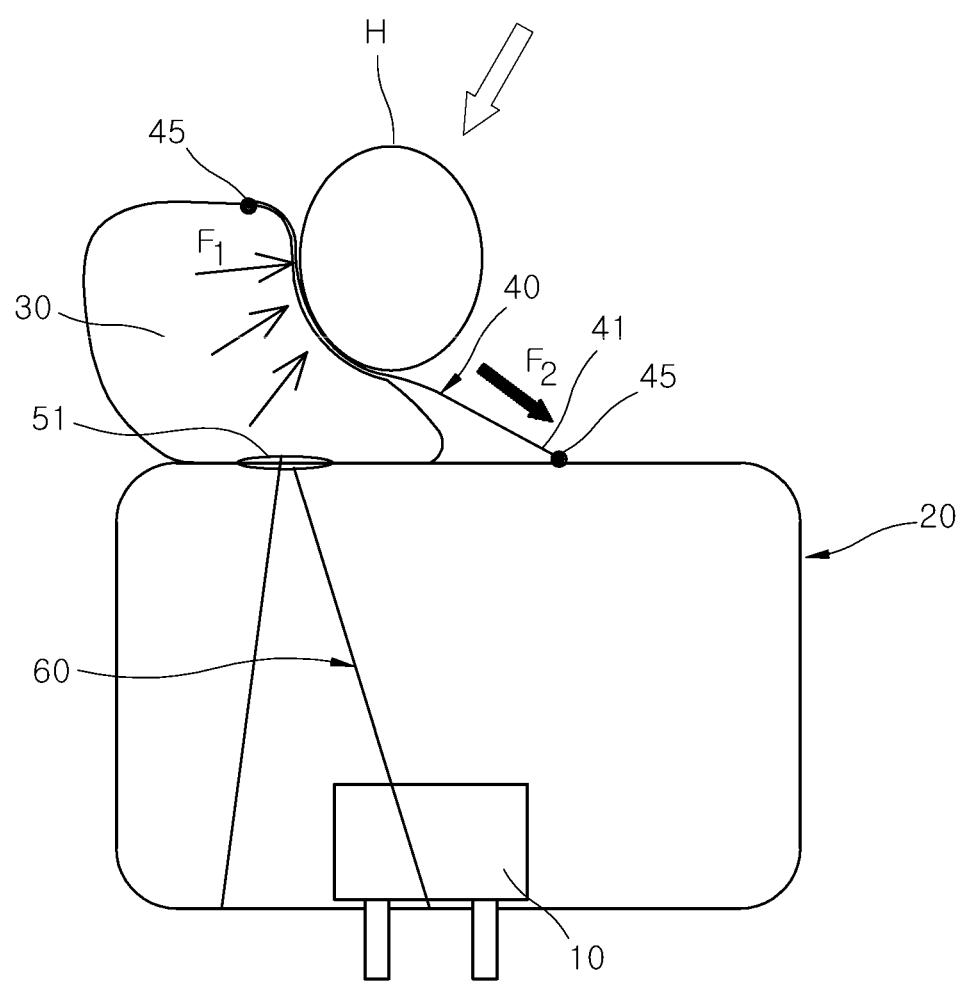
FIG. 42 illustrates that the head of a passenger collides with the second chamber in the airbag apparatus in accordance with the third exemplary embodiment of the present invention.

FIG. 38 illustrates that the temporary attachment part of the second chamber in the airbag apparatus in accordance with the third embodiment of the present invention is torn in case of an oblique collision of the vehicle, FIG. 39 illustrates that the first and second chambers are expanded in the airbag apparatus in accordance with the third embodiment of the present invention, FIG. 40 illustrates that the second chamber is completely deployed in the airbag apparatus in accordance with the third embodiment of the present invention, FIG. 41 illustrates that the first and second chambers are completely deployed in the airbag apparatus in accordance with the third embodiment of the present invention, and FIG. 42 illustrates that a head collides with the second chamber in the airbag apparatus in accordance with the third embodiment of the present invention.

Referring to FIGS. 38 to 42, gas generated through the inflator 10 may be injected to the first chamber 20 in case of an oblique collision of the vehicle. The first chamber 20 may be deployed while expanded toward the rear of the vehicle. That is, the upper portion of the first chamber 20 may be first expanded and deployed, and the lower portion of the first chamber 20 may be then gradually deployed. The gas of the first chamber 20 may be introduced into the second chamber 30 through the communication tube 51. The expansion of the second chamber 30 may tear the temporary attachment part 33 of the folded part 31 (refer to FIG. 38).

At this time, while the first chamber 20 is being deployed, the rear side of the first chamber 20 and the communication tube 51 may be moved toward the rear of the vehicle (refer to FIG. 39). Before the first chamber 20 is completely deployed, the valve tethers 60 may not be tightly pulled.

The second chamber 30 may be completely deployed before the first chamber 20 (refer to FIG. 40). When the deployment of the first chamber 20 is nearly completed, the communication tube 51 may be away from the rear of the first chamber 20. Thus, the valve tethers 60 may be tightly extended toward the rear of the vehicle (refer to FIGS. 37 and 41). At this time, since the plurality of valve tethers 60 close the communication tube 51 by tightening the communication tube 51 to the inside, the gas of the second chamber 30 can be prevented from being discharged to the first chamber 20. Therefore, a reduction in expansion force or supporting force of the second chamber 30 may be prevented.

In case of an oblique collision of the vehicle, the head H may be moved forward in a diagonal direction (refer to FIG.

42). As the head H is moved in the diagonal direction, the head H may pressurize the second chamber 30. Therefore, the second chamber 30 can be pressed against the head H and prevent a turn of the head H, which makes it possible to reduce the time required for holding the head H.

Since the turn of the head H is prevented in case of the oblique collision of the vehicle, an injury of the head H or the neck can be prevented. Furthermore, when the head H is obliquely moved toward the inboard side of the vehicle, the connection tether 40 may pull the second chamber 30 toward the first chamber 20 (outboard side) using the support force of the second chamber 30. Therefore, the head H can be prevented from being away from the second chamber 30.

In case of the oblique collision of the vehicle, the load of the head H may be first absorbed by the tensile force $F_2$ of the connection tether 40, and then absorbed by the buffering force $F_1$ of the second chamber 30. At this time, the connection tether 40 may primarily absorb the load of the head H through the pulling force of the first chamber 20, and the second chamber 30 may secondarily absorb the shock of the head H while deformed by the load of the head H. The load of the head H, transferred to the second chamber 30, may be transferred to the first chamber 20 and thus tertiarily absorbed.

Next, the operation of the airbag apparatus in case of a head-on collision of the vehicle will be described.

Figure 43:
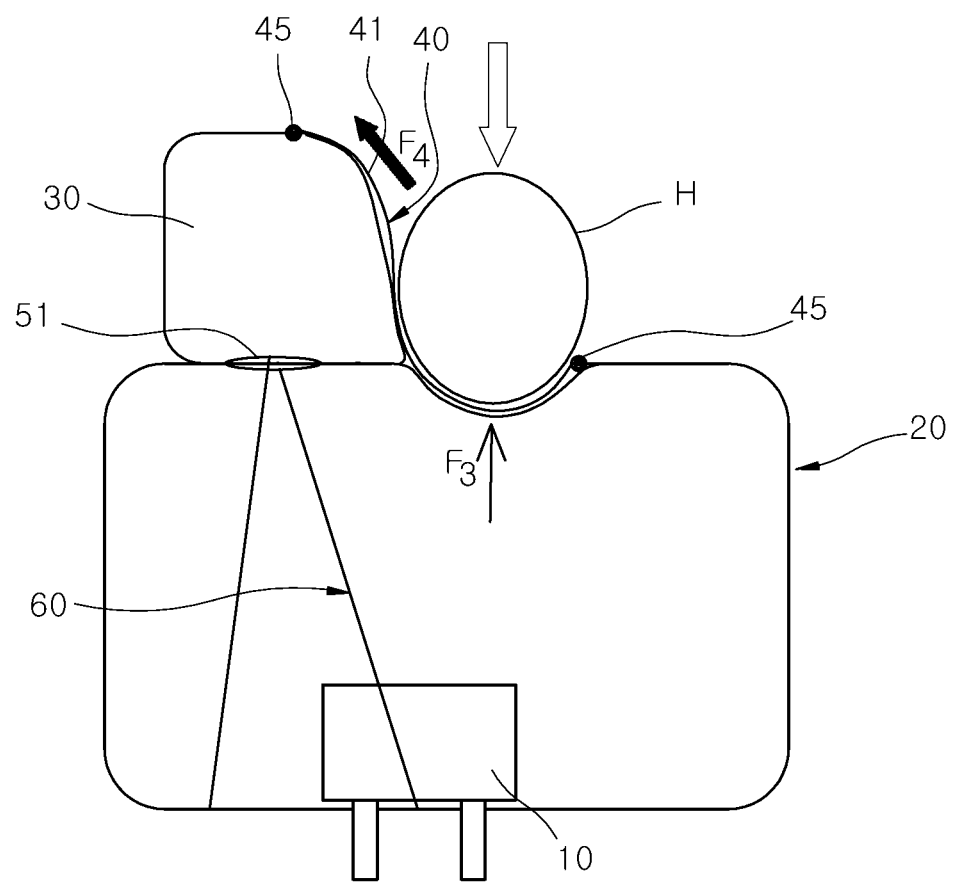
FIG. 43 is a plan view illustrating that the head collides with the first chamber in the airbag apparatus in accordance with the third exemplary embodiment of the present invention, in case of a head-on collision of the vehicle.

FIG. 43 is a plan view illustrating that the head collides with the first chamber in the airbag apparatus in accordance with the third embodiment of the present invention, in case of a head-on collision of the vehicle.

Referring to FIG. 43, the first chamber 20 may be disposed in front of the head H. Thus, in case of a head-on collision of the vehicle, the head H may be moved toward the first chamber 20. At this time, the second chamber 30 may be eccentrically disposed at the inboard side of the first chamber 20 so as to avoid a collision with the head H of the passenger in case of the head-on collision of the vehicle. Therefore, although the second chamber 30 is expanded and deployed toward the rear in case of the head-on collision of the vehicle, the head H can be prevented from being pushed rearward by the second chamber, which makes it possible to prevent the head from being injured or bent rearward by the second chamber 30.

As the first chamber 20 is deformed by the load of the head H, both ends of the connection tether 40 may be pulled by the second chamber 30. Therefore, the load of the head H may be primarily absorbed by the tensile force $F_4$ of the connection tether 40, and secondarily absorbed by the buffering force $F_3$ of the first chamber 20.

In accordance with the embodiments of the present invention, the second chamber may be connected to one side of the first chamber so as to be supported by the first chamber, and suppress the head of the passenger from moving in a diagonal direction in case of an oblique collision of the vehicle. Therefore, the head of the passenger can be prevented from being pushed or turned to one side of the second chamber, and prevented from being away from the second chamber. Furthermore, since a turn of the head is prevented in case of an oblique collision of the vehicle, an injury of the head or the neck can be prevented.

Furthermore, the second chamber may be eccentrically disposed at the inboard side of the first chamber so as to avoid a collision with the head of the passenger in case of a head-on collision of the vehicle. Therefore, although the second chamber is expanded and deployed rearward in case of the head-on collision of the vehicle, the head of the passenger can be prevented from being bent rearward or injured by the second chamber.

Furthermore, since the tether puller closes the communication tube by pulling the tether ring, the tether ring can tighten the communication tube, thereby preventing the spread of the communication tube. Therefore, while gear leakage of the second chamber is prevented, a reduction in expensive force or support force of the second chamber can be prevented. Thus, the support force of the second chamber can be increased in case of a collision with the head, while the head can be suppressed from moving in a diagonal direction.

Furthermore, since the plurality of valve tethers drawn through the cross connector close the communication tube by pulling the communication tube to the inside, a reduction in expensive force or support force of the second chamber can be prevented while gas leakage of the second chamber is prevented. Therefore, the support force of the second chamber can be increased in case of a collision with the head of the passenger, while the head can be suppressed from moving in a diagonal direction.

Furthermore, since the plurality of valve tethers close communication tube by pulling the communication tube to the inside, a reduction in expensive force or support force of the second chamber can be prevented while gas leakage of the second chamber is prevented. Therefore, the support force of the second chamber can be increased in case of a collision with the head of the passenger, while the head can be suppressed from moving in a diagonal direction.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus, comprising:
    a first chamber connected to an inflator, and configured to support a head of a passenger in case of a head-on collision of a vehicle;
    a second chamber connected to one side of the first chamber to be supported by the first chamber, and configured to suppress the head of the passenger from moving in a diagonal direction in case of an oblique collision of the vehicle;
    a communication tube formed on the first chamber configured to introduce gas of the first chamber into the second chamber, and having a tightening channel formed along a circumference of the communication tube; and
    a valve tether comprising:
        a tether ring installed through an inside of the tightening channel; and
        a tether puller connected to the tether ring configured to pull the tether ring in one direction, and connected to the first chamber configured to close the communication tube by pulling the tether ring when the first chamber is completely deployed.

2. The airbag apparatus of claim 1, wherein the second chamber is eccentrically disposed at a side of the first chamber that is facing the passenger to avoid a collision with the head of the passenger in case of a head-on collision of the vehicle.

3. The airbag apparatus of claim 1, wherein the tightening channel has a through-hole through which the tether puller is drawn to the outside of the tightening channel.

4. The airbag apparatus of claim 3, wherein the tether ring has a tightening ring formed at one side of the tether ring, such that the tether puller passes through the tightening ring.

5. The airbag apparatus of claim 4, wherein the tightening ring is disposed in the tightening channel.

6. The airbag apparatus of claim 4, wherein the tightening ring is fixed to the tightening channel by a first fixing sewed portion.

7. The airbag apparatus of claim 3, wherein the tether puller is connected to either side of the tether ring to pass through the through-hole.

8. The airbag apparatus of claim 3, wherein one side of the tether ring is fixed to the tightening channel by a second fixing sewed portion, and
the tether puller is connected to the other side of the tether ring.

9. The airbag apparatus of claim 1, wherein the communication tube is formed in a rectangular shape, and the tightening channel is formed in a rectangular frame shape.

10. The airbag apparatus of claim 1, further comprising a connection tether connecting the first chamber and the second chamber to restrict the second chamber from being pushing to the outside of the first chamber by the head.

11. An airbag apparatus, comprising:
a first chamber connected to an inflator, and configured to support a head of a passenger in case of a head-on collision of a vehicle;
a second chamber connected to one side of the first chamber to be supported by the first chamber, and configured to suppress the head of the passenger from moving in a diagonal direction in case of an oblique collision of the vehicle;
a communication tube formed on the first chamber configured to introduce gas of the first chamber into the second chamber;
a cross connector installed across the communication tube, and both sides of the cross connector are connected to the communication tube; and
a pair of valve tethers connected to the communication tube through the cross connector, and connected to the first chamber configured to close the communication tube by pulling the communication tube when the first chamber is deployed.

12. The airbag apparatus of claim 11, wherein the cross connector further comprises a cross hole through which the pair of valve tethers are passed.

13. The airbag apparatus of claim 12, wherein the cross hole is formed in a longitudinal center of the cross connector.

14. The airbag apparatus of claim 12, wherein both sides of the cross connector are fixed to the communication tube by cross sewed portions, respectively.

15. The airbag apparatus of claim 12, wherein the pair of valve tethers are installed at both sides of the communication tube, and
one end of each of the pair of valve tethers are disposed in the communication tube to face each other.

16. An airbag apparatus, comprising:
a first chamber connected to an inflator, and configured to support a head of a passenger in case of a head-on collision of a vehicle;
a second chamber connected to one side of the first chamber to be supported by the first chamber, and configured to suppress the head of the passenger from moving in a diagonal direction in case of an oblique collision of the vehicle;
a communication tube formed on the first chamber configured to introduce gas of the first chamber into the second chamber; and
a pair of valve tethers connected to the communication tube, and connected to the first chamber configured to close the communication tube by pulling the communication tube when the first chamber is deployed.

17. The airbag apparatus of claim 16, wherein the pair of valve tethers are disposed to cross each other.

18. The airbag apparatus of claim 17, wherein the pair of valve tethers are formed in a band shape.

19. The airbag apparatus of claim 17, wherein the pair of valve tethers are installed at both sides of the communication tube, and
one end of each of the pair of valve tethers are installed in the communication tube to face each other.

20. The airbag apparatus of claim 16, wherein the second chamber is eccentrically disposed at a side of the first chamber that is facing the passenger to avoid a collision with the head of the passenger in case of a head-on collision of the vehicle.

* * * * *